US012535749B2

(12) United States Patent
Tanaka et al.

(10) Patent No.: US 12,535,749 B2
(45) Date of Patent: Jan. 27, 2026

(54) ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Yumi Tanaka, Kanagawa (JP); Shinya Sakamoto, Kanagawa (JP); Masaki Iwase, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 857 days.

(21) Appl. No.: 17/732,525

(22) Filed: Apr. 29, 2022

(65) Prior Publication Data

US 2023/0103207 A1 Mar. 30, 2023

(30) Foreign Application Priority Data

Sep. 27, 2021 (JP) ................................ 2021-157171

(51) Int. Cl.

*G03G 9/087* (2006.01)
*G03G 9/08* (2006.01)
*G03G 15/08* (2006.01)

(52) U.S. Cl.

CPC ....... *G03G 9/08711* (2013.01); *G03G 9/0819* (2013.01); *G03G 9/0821* (2013.01); *G03G 9/08795* (2013.01); *G03G 15/0865* (2013.01)

(58) Field of Classification Search

CPC ............ G03G 9/09811; G03G 9/0819; G03G 9/0821; G03G 15/0865

See application file for complete search history.

(56) References Cited

U.S. PATENT DOCUMENTS 8,741,523 B2 6/2014 Hori et al.
8,771,915 B2 7/2014 Jeda et al.
(Continued)

FOREIGN PATENT DOCUMENTS

EP 2626745 8/2013
JP H09146303 6/1997
(Continued)

OTHER PUBLICATIONS

"Search Report of Europe Counterpart Application", issued on Nov. 2, 2022, p. 1-p. 7.

(Continued)

*Primary Examiner* — Peter L Vajda
*Assistant Examiner* — Jenna Kuipers
(74) *Attorney, Agent, or Firm* — JCIPRNET

(57) ABSTRACT

An electrostatic charge image developing toner contains toner particles that contain a binder resin, in which each of a loss modulus G"5 (150) of the electrostatic charge image developing toner determined by measuring dynamic viscoelasticity of the electrostatic charge image developing toner at a temperature of 150° C. and a strain of 5% and a loss modulus G"50 (180) of the electrostatic charge image developing toner determined by measuring dynamic viscoelasticity of the electrostatic charge image developing toner at a temperature of 180° C. and a strain of 50% is $1\times10^3$ Pa or more and $1\times10^4$ Pa or less, and a relationship between a loss modulus G"5 (t1) of the electrostatic charge image developing toner at a first temperature t1 in a temperature range of 150° C. or higher and 180° C. or lower and a strain of 5% and a loss modulus G"50 (t2) of the electrostatic charge image developing toner at a second temperature t2 higher than the first temperature t1 in the temperature range of 150° C. or higher and 180° C. or lower and a strain of 50% satisfies the following Formula (1) in a case of a (Continued)

temperature difference (t2−t1) between the first temperature t1 and the second temperature t2 is 15° C. or higher.

$$1<G''5(t1)/G''50(t2)<3.0 \quad \text{Formula (1)}$$

14 Claims, 2 Drawing Sheets

(56) References Cited

U.S. PATENT DOCUMENTS

| | | | | |
|---|---|---|---|---|
| 10,698,328 | B2 | 6/2020 | Kawamura et al. | |
| 2006/0063087 | A1 | 3/2006 | Ninomiya et al. | |
| 2009/0142687 | A1 | 6/2009 | Ariyoshi et al. | |
| 2014/0255840 | A1* | 9/2014 | Sekiguchi | G03G 9/081 430/105 |
| 2017/0219947 | A1* | 8/2017 | Omori | G03G 9/0819 |

FOREIGN PATENT DOCUMENTS

| | | | |
|---|---|---|---|
| JP | 2006091168 | | 4/2006 |
| JP | 2006195106 | | 7/2006 |
| JP | 2011237792 | | 11/2011 |
| JP | 2011237793 | | 11/2011 |
| JP | 2013160886 | | 8/2013 |
| JP | 2017044864 | A * | 3/2017 |
| JP | 2019020690 | A * | 2/2019 |
| JP | 2019144368 | | 8/2019 |
| JP | 2020042121 | | 3/2020 |
| JP | 2020042122 | | 3/2020 |
| JP | 2020106685 | | 7/2020 |
| WO | 2013141029 | | 9/2013 |

OTHER PUBLICATIONS

"Notice of Reasons for Refusal of Japan Counterpart Application", issued on May 27, 2025, with English translation thereof, p. 1-p. 7.

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2021-157171 filed Sep. 27, 2021.

BACKGROUND

(i) Technical Field

The present invention relates to an electrostatic charge image developing toner, an electrostatic charge image developer, a toner cartridge, a process cartridge, an image forming apparatus, and an image forming method.

(ii) Related Art

JP2020-042122A describes an electrostatic latent image developing toner containing toner particles that contain a binder resin, in which the binder resin contains an amorphous resin and a crystalline resin, and in a case where S130 represents an integral value of stress in a stress-strain curve at a strain amplitude of 100% plotted by measuring strain dispersion of dynamic viscoelasticity under the conditions of a temperature of 130° C., a frequency of 1 Hz, and a strain amplitude of 1.0% to 500%, and θ130 represents a slope of a major axis, S130 is more than 0 Pa and 350,000 Pa or less, and θ130 is more than 22° and less than 90°.

JP2020-106685A discloses an electrostatic charge image developing toner containing at least a binder resin and a release agent, in which the binder resin contains at least a crystalline resin, and a storage modulus of the toner measured at a frequency of 1 Hz, 150° C., and a strain varied in a range of 0.01% to 1,000% satisfies a specific relationship.

JP2020-042121A describes an electrostatic latent image developing toner containing toner particles that contain a binder resin, in which the binder resin contains an amorphous vinyl resin and a crystalline resin, and in a case where S130 represents an integral value of stress in a stress-strain curve at a strain amplitude of 100% plotted by measuring strain dispersion of dynamic viscoelasticity under the conditions of a temperature of 130° C., a frequency of 1 Hz, and a strain amplitude of 1.0% to 500%, and θ130 represents a slope of a major axis, S130 is more than 0 Pa and 350,000 Pa or less, and θ130 is 0° or more and less than 10°.

JP2019-144368A discloses an electrostatic charge image developing toner containing toner base particles that contain at least a binder resin and a release agent and an external additive, in which the binder resin contains at least a crystalline resin, and a peak top value tan δ 6° C./min of a loss tangent of the electrostatic charge image developing toner measured under the conditions of a frequency of 1 Hz and a heating rate of 6° C./min at a temperature raised to 100° C. from 25° C. and a peak top value tan δ 3° C./min of a loss tangent of the electrostatic charge image developing toner measured under the conditions of a frequency of 1 Hz and a heating rate of 3° C./min at a temperature raised to 100° C. from 25° C. satisfy a specific relationship.

JP2013-160886A discloses an electrostatic charge image developing toner containing at least a binder resin, a colorant, and a release agent, in which γG' that represents a rate of change of a storage modulus G' of the toner satisfies 50%<γG'<86%, γG" as a rate of change of a loss modulus G" of the toner is higher than 50%, the storage modulus G' of the toner at a temperature of 150° C. under a strain ranging from 1% to 50% is $5\times10^2$ to $3.5\times10^3$ Pa·s, and the binder resin contains an amorphous resin and a crystalline resin.

JP2011-237793A and JP2011-237792A disclose an electrostatic charge image developing toner consisting of toner particles that contain a binder resin, in which the binder resin is found to have a domain·matrix structure consisting of a high elasticity resin configuring a domain and a low elasticity resin configuring a matrix in an elasticity image showing a cross section of the toner particles captured with an atomic force microscope (AFM), an arithmetic mean of a ratio of a major axis L of each domain to a minor axis W of each domain (L/W) is in a range of 1.5 to 5.0, a proportion of domains having the major axis L in a range of 60 to 500 nm is 80% by number or more, and a proportion of domains having the minor axis W in a range of 45 to 100 nm is 80% by number or more.

SUMMARY

In the process of forming an image by using an electrostatic charge image developing toner, for example, a toner image transferred to a recording medium is fixed to the recording medium by heating and pressing. Here, in a case where an electrostatic charge image developing toner containing toner particles that readily melt by heating is used to obtain excellent fixability, in the event of forming a fixed image including a region where a toner application amount is low and a region where a toner application amount is high, sometimes image density varies between the regions and leads to density unevenness in the image.

Aspects of non-limiting embodiments of the present disclosure relate to an electrostatic charge image developing toner, an electrostatic charge image developer, a toner cartridge, a process cartridge, an image forming apparatus, and an image forming method that obtain better fixability and makes it possible to obtain a fixed image with slighter image density unevenness between a region where a toner application amount is low and a region where a toner application amount is high, compared to an electrostatic charge image developing toner that does not satisfy Formula (1).

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The above aspect is achieved by the following means.

According to an aspect of the present disclosure, there is provided an electrostatic charge image developing toner contains toner particles that contain a binder resin, in which each of a loss modulus G"5 (150) of the electrostatic charge image developing toner determined by measuring dynamic viscoelasticity of the electrostatic charge image developing toner at a temperature of 150° C. and a strain of 5% and a loss modulus G"50 (180) of the electrostatic charge image developing toner determined by measuring dynamic viscoelasticity of the electrostatic charge image developing toner at a temperature of 180° C. and a strain of 50% is $1\times10^3$ Pa or more and $1\times10^4$ Pa or less, and a relationship between a loss modulus G"5 (t1) of the electrostatic charge image developing toner at a first temperature t1 in a temperature range of 150° C. or higher and 180° C. or lower and a strain of 5% and a loss modulus G"50 (t2) of the electrostatic charge image developing toner at a second temperature t2 higher than the first temperature t1 in the temperature range of 150° C. or higher and 180° C. or lower and a strain of 50% satisfies the following Formula (1) in a case of a temperature difference (t2−t1) between the first temperature t1 and the second temperature t2 is 15° C. or higher.

$$1<G''5(t1)/G''50(t2)<3.0 \quad \text{Formula (1)}$$

BRIEF DESCRIPTION OF THE DRAWINGS

Exemplary embodiment(s) of the present invention will be described in detail based on the following figures, wherein.

DETAILED DESCRIPTION

Figure 1:
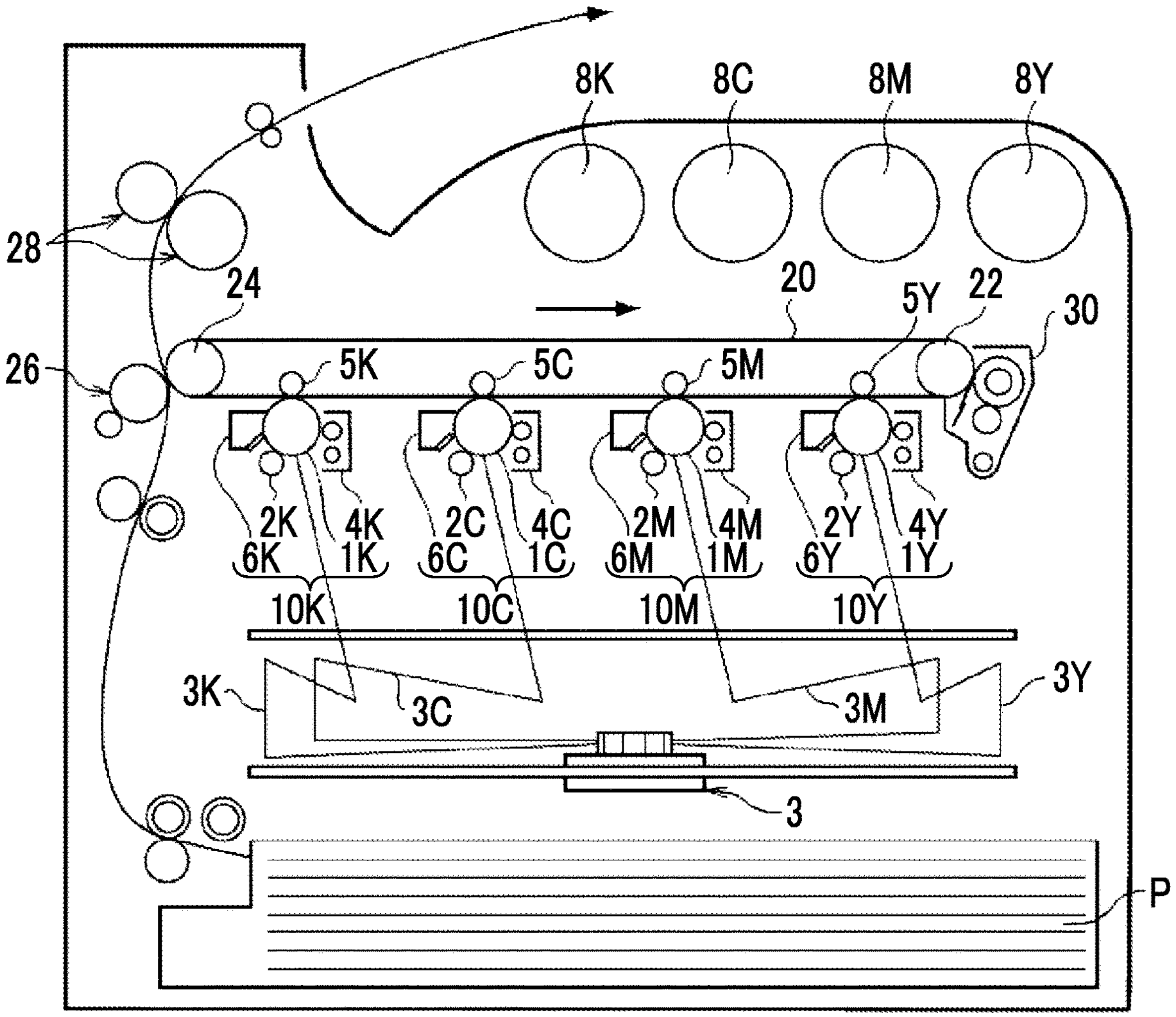
FIG. 1 is a view schematically showing the configuration of an example of an image forming apparatus according to the present exemplary embodiment.

The exemplary embodiments as an example of the present invention will be described below. The following descriptions and examples merely illustrate the exemplary embodiments, and do not limit the scope of the invention.

Regarding the ranges of numerical values described in stages in the present specification, the upper limit or lower limit of a range of numerical values may be replaced with the upper limit or lower limit of another range of numerical values described in stages. Furthermore, in the present specification, the upper limit or lower limit of a range of numerical values may be replaced with values described in examples.

In the present specification, "(meth)acryl" means both the acryl and methacryl.

In the present specification, the term "step" includes not only an independent step but a step which is not clearly distinguished from other steps as long as the intended goal of the step is achieved.

Each component may include a plurality of corresponding substances.

In a case where the amount of each component in a composition is mentioned, and there are two or more kinds of substances corresponding to each component in the composition, unless otherwise specified, the amount of each component means the total amount of two or more kinds of the substances present in the composition.

Electrostatic Charge Image Developing Toner

The electrostatic charge image developing toner according to the present exemplary embodiment (hereinafter, also called "toner") contains toner particles containing a binder resin, in which each of a loss modulus G"5 (150) of the electrostatic charge image developing toner determined by measuring dynamic viscoelasticity of the electrostatic charge image developing toner at a temperature of 150° C. and a strain of 5% and a loss modulus G"50 (180) of the electrostatic charge image developing toner determined by measuring dynamic viscoelasticity of the electrostatic charge image developing toner at a temperature of 180° C. and a strain of 50% is $1\times10^3$ Pa or more and $1\times10^4$ Pa or less, and a relationship between a loss modulus G"5 (t1) of the electrostatic charge image developing toner at a first temperature t1 in a temperature range of 150° C. or higher and 180° C. or lower and a strain of 5% and a loss modulus G"50 (t2) of the electrostatic charge image developing toner at a second temperature higher than the first temperature t1 in the temperature range of 150° C. or higher and 180° C. or lower and a strain of 50% satisfies the following Formula (1) in the case of a temperature difference (t2−t1) between the first temperature t1 and the second temperature t2 is 15° C. or higher.

$$1<G''5(t1)/G''50(t2)<3.0 \quad \text{Formula (1)}$$

Hereinafter, the toner having the above configuration will be also called "specific toner".

Hereinafter, the region where the toner application amount is low will be also called "low application region", and the region where the toner application amount is high will be also called "high application region".

As described above, in order to obtain excellent fixability, the use of an electrostatic charge image developing toner containing toner particles that readily melt by heating is considered. However, in a case where images are formed using the toner containing toner particles that readily melt by heating as in the related art, for example, in a fixing step, the toner particles melt and have excessively low viscosity. As a result, the cohesive force between the toner particles in the fixed image layer is likely to be weak, and the hardness of the fixed image layer tends to be reduced. Consequently, a part of the surface of the fixed image layer sticks to a fixing member or the like and is thus defective, which sometimes makes the fixed image rough. Furthermore, in a case where the pressure of a fixing roll is high, the cohesive force between the toner particles in the fixed image layer tends to further weaken further. As a result, the surface of the fixed image is more likely to have defects, and the fixed image is markedly roughened. For example, in a case where one sheet of image includes regions with different toner application amounts, and the fixed image is roughened, it is not easy to visually recognize the roughness in the high application region even though this region is roughened. However, it is easy to visually recognize the roughness in the low application region, and the roughness in this region is visually recognized as a difference in image density (image density unevenness) between the low application region and the high application region.

In addition, for example, in a case where images are formed using a toner containing toner particles that do not readily melt by heating, the toner particles in a low application region are likely to relatively poorly melt. Accordingly, in one sheet of image, both the portion that has not melted and the portion that has melted tend to exist. As a result, the existence of such portions is visually recognized as a difference in image density (image density unevenness) between the low application region and the high application region.

The image density unevenness is likely to be marked especially in a case where images are formed using a recording medium with high surface roughness, such as rough paper or embossed paper.

On the other hand, due to the above configuration, the electrostatic charge image developing toner according to the present exemplary embodiment may obtain excellent fixability and reduces the image density unevenness between a region where a toner application amount is low and a region where a toner application amount is high in a fixed image. The reason is presumed as follows.

As for the electrostatic charge image developing toner according to the present exemplary embodiment, each of a loss modulus G"5 (150) of the toner determined by measuring dynamic viscoelasticity of the toner at a temperature of 150° C. and a strain of 5% and a loss modulus G"50 (180) of the toner determined by measuring dynamic viscoelasticity of the toner at a temperature of 180° C. and a strain of 50% is $1\times10^3$ Pa or more and $1\times10^4$ Pa or less. That is, for example, even though pressure is applied to the specific toner by a fixing member or the like at a high temperature, the rate of contribution of energy generated by pressure and strain contributes to the deformation of the toner particles is appropriate. Furthermore, the electrostatic charge image developing toner according to the present exemplary embodiment satisfies Formula (1). That is, the specific toner has appropriate hardness, and the storage modulus G' of the specific toner at each of the temperatures of 150° C. and 180° C. has weak strain dependence. Therefore, even though the temperature of the low application region is higher than the temperature of the high application region, and the low application region is greatly affected by pressure, the toner particles in the low application region are inhibited from being deformed relatively much.

Presumably, for the aforementioned reasons, for example, even in a case where a recording medium with high roughness is used under fixing conditions of high temperature and high pressure, excellent fixability may be obtained, and the image density unevenness between a region where a toner application amount is low and a region where a toner application amount is high in a fixed image may be reduced regardless of the toner application amount.

Characteristics of Toner

Viscoelasticity of Toner

In a case where G"5 (150) represents a loss modulus of the specific toner determined by measuring dynamic viscoelasticity of the specific toner at a temperature of 150° C. and a strain of 5%, G"5 (150) is $1\times10^3$ Pa or more and $1\times10^4$ Pa or less. From the viewpoint of further reducing image density unevenness between a region where a toner application amount is low and a region where a toner application amount is high in a fixed image, G"5 (150) is, for example, more preferably $2.0\times10^3$ Pa or more and $8.0\times10^3$ Pa or less, and even more preferably $4.0\times10^3$ Pa or more and $6.0\times10^3$ Pa or less.

In a case where G"50 (180) represents a loss modulus of the specific toner determined by measuring dynamic viscoelasticity of the specific toner at a temperature of 180° C. and a strain of 50%, G"50 (180) is $1\times10^3$ Pa or more and $1\times10^4$ Pa or less. From the viewpoint of further reducing image density unevenness between a region where a toner application amount is low and a region where a toner application amount is high in a fixed image, G"50 (180) is, for example, more preferably $1.0\times10^3$ Pa or more and $5.0\times10^3$ Pa or less, and even more preferably $1.0\times10^3$ Pa or more and $3.0\times10^3$ Pa or less.

In a case where G"1 (150) represents a loss modulus G" of the specific toner determined by measuring dynamic viscoelasticity of the specific toner at a temperature of 150° C. and a strain of 1%, G"1 (150) is, for example, preferably more than $1\times10^3$ and less than $1\times10^5$, more preferably $2.0\times10^3$ or more and $5.0\times10^4$ or less, and even more preferably $4.0\times10^3$ Pa or more and $1.0\times10^4$ Pa or less.

In a case where G"50 (150) represents a loss modulus G" of the specific toner determined by measuring dynamic viscoelasticity of the specific toner at a temperature of 150° C. and a strain of 50%, G"50 (150) is, for example, preferably more than $1\times10^3$ Pa and less than $1\times10^5$ Pa, more preferably $2.0\times10^3$ Pa or more and less than $1.0\times10^4$ Pa, and even more preferably $3.0\times10^3$ Pa or more and $5.0\times10^3$ Pa or less.

In a case where G"1 (180) represents a loss modulus G" of the specific toner determined by measuring dynamic viscoelasticity of the specific toner at a temperature of 180° C. and a strain of 50%, G"1 (180) is, for example, preferably more than $1\times10^3$ Pa and less than $1\times10^5$ Pa, more preferably $1.0\times10^3$ Pa or more and $1.0\times10^4$ Pa or less, and even more preferably $2.0\times10^3$ Pa or more and $5.0\times10^3$ Pa or less.

In a case where all of G"1 (150), G"50 (150), and G"1 (180) are in the above range, better fixability is obtained than in a case where G"1 (150), G"50 (150), and G"1 (180) are larger than the above range, and the image density unevenness is further reduced than in a case where G"1 (150), G"50 (150), and G"1 (180) are smaller than the above range.

The upper limit of G"50 (150)/G"50 (180) in the specific toner is, for example, preferably 2.2 or less, more preferably 2.0 or less, and even more preferably 1.8 or less. In a case where the value of G"50 (150)/G"50 (180) is in the above range, the image density unevenness is further reduced than in a case where the value of G"50 (150)/G"50 (180) is larger than the above range.

The lower limit of G"50 (150)/G"50 (180) in the specific toner is preferably, for example, more than 1. The lower limit of G"50 (150)/G"50 (180) may be 1.2 or more or 1.4 or more.

The upper limit of G"1 (150)/G"50 (180) in the specific toner is, for example, preferably 3.1 or less, more preferably 2.9 or less, and even more preferably 2.7 or less. In a case where the value of G"1 (150)/G"50 (180) is in the above range, the image density unevenness is further reduced than in a case where the upper limit of G"1 (150)/G"50 (180) is larger than the above range.

The lower limit of G"1 (150)/G"50 (180) in the specific toner is not particularly limited as long as the lower limit is more than 1. The lower limit of G"1 (150)/G"50 (180) may be 1.2 or more or 1.5 or more.

The value of G"1 (180)/G"50 (180) in the specific toner is, for example, preferably less than 1.5, more preferably 1.4 or less, and even more preferably 1.35 or less. In a case where the value of G"1 (180)/G"50 (180) is in the above range, the image density unevenness is further reduced than in a case where the value of G"1 (180)/G"50 (180) is larger than the above range.

The value of G"1 (180)/G"50 (180) is not particularly limited as long as the value is larger than 1. The value of G"1 (180)/G"50 (180) may be 1.1 or more or 1.2 or more.

The value of G"1 (150)/G"1 (180) in the specific toner is, for example, preferably less than 2.5, more preferably 2.3 or less, and even more preferably 2.2 or less. In a case where the value of G"1 (150)/G"1 (180) is in the above range, the image density unevenness is further reduced than in a case where the value of G"1 (150)/G"1 (180) is larger than the above range.

The value of G"1 (150)/G"1 (180) in the specific toner is not particularly limited as long as the value is larger than 1. The value of G"1 (150)/G"1 (180) may be 1.5 or more or 1.8 or more.

There is no particular limit on the specific methods for making G"5 (150), G"50 (180), G"1 (150), G"50 (150), G"1 (180), G"50 (180), G"50 (150)/G"50 (180), and G"1 (150)/G"50 (180) fall into the above ranges. Examples of the methods include a method of dispersing the aforementioned specific resin particles in the toner particles and the like.

In a case where G"5 (t1) represents a loss modulus G" of the specific toner determined at a certain temperature t1 in a temperature range of 150° C. or higher and 180° C. or lower and a strain of 5%, G"5 (t1) is, for example, preferably $2.0\times10^3$ Pa or more and $8.0\times10^3$ Pa or less, and more preferably $4.0\times10^3$ Pa or more and $6.0\times10^3$ Pa or less. In a case where the value of G"5 (t1) is in the above range, the image density unevenness is further reduced than in a case where the G"5 (t1) is larger than the above range.

In a case where G"50 (t2) represents a loss modulus G" of the specific toner determined at a temperature t2 higher than the temperature t1 in the temperature range of 150° C. or higher and 180° C. or lower and a strain of 50%, G"50 (t2) is, for example, preferably $1.0\times10^3$ Pa or more and $5.0\times10^3$ Pa or less, and more preferably $1.0\times10^3$ Pa or more and $3.0\times10^3$ Pa or less. In a case where the value of G"50 (t2) is in the above range, the image density unevenness is further reduced than in a case where the G"50 (t2) is larger than the above range.

The relationship between the loss modulus G"5 (t1) of the specific toner that is determined at the first temperature t1 in a temperature range of 150° C. or higher and 180° C. or lower and a strain of 5% and the loss modulus G"50 (t2) of the specific toner that is determined at the second temperature t2 higher than the first temperature t1 in the temperature range of 150° C. or higher and 180° C. or lower and a strain of 50% satisfies the following Formula (1) when a temperature difference (t2−t1) between the first temperature t1 and the second temperature t2 is 15° C. or higher. From the viewpoint of further reducing image density unevenness between a region where a toner application amount is low and a region where a toner application amount is high in a fixed image, the relationship between the loss modulus G"5 (t1) and the loss modulus G"50 (t2), for example, preferably satisfies the following Formula (1-2), more preferably satisfies the following Formula (1-3), and even more preferably satisfies the following Formula (1-4).

$$1<G''5(t1)/G''50(t2)<3.0 \quad \text{Formula (1)}$$

$$1.20<G''5(t1)/G''50(t2)<2.90 \quad \text{Formula (1-2)}$$

$$1.30<G''5(t1)/G''50(t2)<2.80 \quad \text{Formula (1-3)}$$

$$1.40<G''5(t1)/G''50(t2)<2.752.75 \quad \text{Formula (1-4)}$$

The temperature difference (t2−t1) between the first temperature t1 and the second temperature t2 is 15° C. or higher. The temperature difference (t2−t1) may be 15° C. or higher and 30° C. or lower, 25° C. or higher and 30° C. or lower, or 30° C.

The loss modulus of the toner is determined as follows.

Specifically, by a press molding machine, a toner as a measurement target is molded into tablets at room temperature (25° C.), thereby preparing a measurement sample. Then, by using the measurement sample, dynamic viscoelasticity is measured with a rheometer under the following conditions.

From each of the obtained loss modulus curves, the loss modulus at each temperature and each strain is determined.

Measurement Condition

Measurement device: rheometer ARES-G2 (manufactured by TA Instruments)

Fixture: 8 mm parallel plates

Gap: adjusted to 3 mm

Frequency: 1 Hz

For example, it is preferable that a storage modulus G' of the toner be $1\times10^8$ Pa or more in a range of 30° C. or higher and 50° C. or lower, and that a temperature (that is, at a specific elastic modulus achieving temperature) at which the storage modulus G' of the toner reaches a value less than $1\times10^5$ Pa is 70° C. or higher and 90° C. or lower. The toner having the storage modulus G' satisfying the above conditions has a high elastic modulus at a low temperature and a low elastic modulus at a temperature of 70° C. or higher and 90° C. or lower. Therefore, in a case where the storage modulus G' of the toner satisfies the above conditions, the toner more readily melts by heating, and better fixability is obtained, than in a case where the temperature at which the storage modulus G' of the toner reaches a value less than $1\times10^5$ Pa is higher than 90° C.

The storage modulus G' of the toner in a range of 30° C. or higher and 50° C. or lower is, for example, preferably $1\times10^8$ Pa or more, more preferably $1\times10^8$ Pa or more and $1\times10^9$ Pa or less, and even more preferably $2\times10^8$ Pa or more and $6\times10^8$ Pa or less.

In a case where the storage modulus G' of the toner in a range of 30° C. or higher and 50° C. or lower is in the above range, the storage stability of the toner is further improved than in a case where the storage modulus G' of the toner in a range of 30° C. or higher and 50° C. or lower is lower than the above range, and the obtained fixability is likely to be better than in a case where the storage modulus G' of the toner in a range of 30° C. or higher and 50° C. or lower is higher than the above range.

The specific elastic modulus achieving temperature of the toner is, for example, preferably 65° C. or higher and 90° C. or lower, more preferably 70° C. or higher and 87° C. or lower, and even more preferably 75° C. or higher and 84° C. or lower.

In a case where the specific elastic modulus achieving temperature of the toner is in the above range, the storage stability of the toner is further improved than in a case where the specific elastic modulus achieving temperature of the toner is lower than the above range, and the obtained fixability is likely to be better than in a case where the specific elastic modulus achieving temperature of the toner is higher than the above range.

The storage modulus G' of the toner in a range of 30° C. or higher and 50° C. or lower and the specific elastic modulus achieving temperature of the toner are determined as follows.

Specifically, by a press molding machine, a toner as a measurement target is molded into tablets at room temperature (25° C.), thereby preparing a measurement sample. Then, the obtained measurement sample is interposed between parallel plates having a diameter of 8 mm, and dynamic viscoelasticity is measured under the following conditions by raising the measurement temperature from 30° C. to 180° C. at 2° C./min at a strain of 0.1% or more and 100% or less. From each of the storage modulus and loss modulus curves obtained by the measurement, the storage modulus G' is determined.

Measurement Condition

Measurement device: rheometer ARES-G2 (manufactured by TA Instruments)

Fixture: 8 mm parallel plates

Gap: adjusted to 3 mm

Frequency: 1 Hz

There is no particular limit on the methods for making the storage modulus G' of the toner in a range of 30° C. or higher and 50° C. or lower and the specific elastic modulus achieving temperature of the toner fall into the above ranges. Examples of the methods include a method of dispersing the aforementioned specific resin particles in the toner particles and the like.

The method for obtaining the specific toner is not particularly limited. Examples of the method include a method of dispersing resin particles in toner particles, the resin particles having the storage modulus G' of $1\times10^5$ Pa or more and $5\times10^7$ Pa or less in a range of 30° C. or higher and 180° C. or lower in the dynamic viscoelasticity measurement at a heating rate of 2° C./min.

Hereinafter, the resin particles having the storage modulus G' of $1\times10^5$ Pa or more and $5\times10^7$ Pa or less in a range of 30° C. or higher and 180° C. or lower will be also called "specific resin particles".

The reason why the method of dispersing the specific resin particles in the toner particles makes it easy to obtain the specific toner is unclear, but is assumed to be as follows.

As described above, the specific resin particles are particles that have the storage modulus G' of $1\times10^5$ Pa or more even though the temperature is raised to 180° C. That is, the specific resin particles are particles having a high elastic modulus at a high temperature. Therefore, presumably, in a case where the toner particles contain the specific resin particles, the overall loss modulus of the toner at a high temperature and a high strain is unlikely to increase, and the temperature dependence and strain dependence of the loss modulus is likely to be reduced, which may make it easy to obtain the specific toner.

The storage modulus G' of the resin particles and the loss tangent tan δ, which will be described later, of the resin particles are determined as follows.

Specifically, by applying pressure to the resin particles as a measurement target, a disk-shaped sample having a thickness of 2 mm and a diameter of 8 mm is prepared and used as a measurement sample. In a case where the resin particles contained in the toner particles are to be measured, the resin particles are isolated from the toner particles and then used for preparing the measurement sample. Examples of the method for isolating the resin particles from the toner particles include a method of immersing the toner particles in a solvent that dissolves the binder resin but does not dissolve the resin particles and dissolving the binder resin in the solvent so as to isolate the resin particles.

Then, the obtained disk-shaped sample as a measurement sample is interposed between parallel plates having a diameter of 8 mm, and dynamic viscoelasticity is measured under the following conditions by raising the measurement temperature from 30° C. to 150° C. at 2° C./min at a strain of 0.1% to 100%. From each of the storage modulus and loss modulus curves obtained by the measurement, the storage modulus G' and the loss tangent tan δ are determined.

Measurement Condition

Measurement device: rheometer ARES-G2 (manufactured by TA Instruments)

Gap: adjusted to 3 mm

Frequency: 1 Hz

Hereinafter, a toner according to the present exemplary embodiment will be specifically described.

The toner according to the present exemplary embodiment is configured with toner particles and external additives which are used as necessary.

Toner Particles

The toner particles contain at least a binder resin, and may contain other components as necessary.

Furthermore, as described above, from the viewpoint of obtaining the specific toner, for example, it is preferable that the toner particles further contain the specific resin particles.

Hereinafter, as an example of the toner particles contained in the specific toner, toner particles containing a binder resin and the specific resin particles will be described.

The toner particles are configured, for example, with a binder resin, the specific resin particles, and, as necessary, a colorant, a release agent, and other additives.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

It is preferable that the binder resin contain, for example, a polyester resin.

In a case where the toner particles contain a polyester resin as a binder resin, in the event of using styrene-(meth) acrylic resin particles as the specific resin particles, a difference between an SP value (S) as a solubility parameter of the specific resin particles and an SP value (R) as a solubility parameter of the binder resin (SP value (S)–SP value (R)), which will be described later, is likely to fall into a preferable numerical range. Therefore, the specific resin particles are readily dispersed in the toner particles, and as a result, the image density unevenness is reduced.

It is preferable that the binder resin contain, for example, a crystalline resin and an amorphous resin. The crystalline resin means a resin having a clear endothermic peak instead of showing a stepwise change in amount of heat absorbed, in differential scanning calorimetry (DSC).

In contrast, the amorphous resin means a resin which shows only a stepwise change in amount of heat absorbed instead of having a clear endothermic peak in a case where the resin is measured by a thermoanalytical method using differential scanning calorimetry (DSC), and stays as a solid at room temperature but turns thermoplastic at a temperature equal to or higher than a glass transition temperature.

Specifically, for example, the crystalline resin means a resin which has a half-width of an endothermic peak of 10° C. or less in a case where the resin is measured at a heating rate of 10° C./min, and the amorphous resin means a resin which has a half-width of more than 10° C. or a resin for which a clear endothermic peak is not observed.

The crystalline resin will be described.

Examples of the crystalline resin include known crystalline resins such as a crystalline polyester resin and a crystalline vinyl resin (for example, a polyalkylene resin, a long-chain alkyl (meth)acrylate resin, and the like). Among these, in view of mechanical strength and low-temperature fixability of the toner, for example, a crystalline polyester resin is preferable.

Crystalline Polyester Resin

Examples of the crystalline polyester resin include a polycondensate of a polyvalent carboxylic acid and a polyhydric alcohol. As the crystalline polyester resin, a commercially available product or a synthetic resin may be used.

The crystalline polyester resin easily forms a crystal structure. Therefore, for example, a polycondensate which uses not a polymerizable monomer having an aromatic group but a polymerizable monomer having a linear aliphatic group is preferable.

Examples of the polyvalent carboxylic acid include aliphatic dicarboxylic acids (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,18-octadecanedicarboxylic acid, and the like), aromatic dicarboxylic acids (for example, dibasic acids such as phthalic acid, isophthalic acid, terephthalic acid, and naphthalene-2,6-dicarboxylic acid), anhydrides of these, and lower alkyl esters (for example, having 1 or more and 5 or less carbon atoms) of these.

As the polyvalent carboxylic acid, a carboxylic acid having a valency of 3 or more that has a crosslinked structure or a branched structure may be used in combination with a dicarboxylic acid. Examples of trivalent carboxylic acids include aromatic carboxylic acids (for example, 1,2,3-benzenetricarboxylic acid, 1,2,4-benzenetricarboxylic acid, 1,2,4-naphthalenetricarboxylic acid, and the like), anhydrides of these, and lower alkyl esters (for example, having 1 or more and 5 or less carbon atoms) of these.

As the polyvalent carboxylic acid, a dicarboxylic acid having a sulfonic acid group and a dicarboxylic acid having an ethylenic double bond may be used in combination with these dicarboxylic acids.

One kind of polyvalent carboxylic acid may be used alone, or two or more kinds of polyvalent carboxylic acids may be used in combination.

Examples of the polyhydric alcohol include an aliphatic diol (for example, a linear aliphatic diol having 7 or more and 20 or less carbon atoms in the main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, and the like. As the aliphatic diol, among these, for example, 1,8-octanediol, 1,9-nonanediol, and 1,10-decanediol are preferable.

As the polyhydric alcohol, an alcohol having three or more hydroxyl groups and a crosslinked structure or a branched structure may be used in combination with a diol. Examples of the alcohol having three or more hydroxyl groups include glycerin, trimethylolethane, trimethylolpropane, pentaerythritol, and the like.

One kind of polyhydric alcohol may be used alone, or two or more kinds of polyhydric alcohols may be used in combination.

The content of the aliphatic diol in the polyhydric alcohol may be 80 mol % or more and, for example, preferably 90 mol % or more.

The melting temperature of the crystalline polyester resin is, for example, preferably 50° C. or higher and 100° C. or lower, more preferably 55° C. or higher and 90° C. or lower, and even more preferably 60° C. or higher and 85° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The weight-average molecular weight (Mw) of the crystalline polyester resin is, for example, preferably 6,000 or more and 35,000 or less.

The crystalline polyester resin can be obtained by a known manufacturing method, for example, just as amorphous polyester.

In a case where the toner particles contain the crystalline resin, a content of the crystalline resin with respect to the total mass of the binder resin is, for example, preferably 4% by mass or more and 50% by mass or less, more preferably 6% by mass or more and 30% by mass or less, and even more preferably 8% by mass or more and 20% by mass or less.

In a case where the ratio of the crystalline resin contained in the toner particles is in the above range, better fixability is obtained, than in a case where the ratio of the crystalline resin contained in the toner particles is lower than the above range. Furthermore, in a case where the content of the crystalline resin is in the above range, compared to a case where the content of the crystalline resin is higher than the above range, an excessive reduction of image density in a low application region of a fixed image, the reduction of image density resulting from an excessively high content of the crystalline resin having relatively low elasticity, is further suppressed. As a result, the image density unevenness is reduced.

The amorphous resin will be described.

Examples of the amorphous resin include known amorphous resins such as an amorphous polyester resin, an amorphous vinyl resin (for example, a styrene acrylic resin) an epoxy resin, a polycarbonate resin, and a polyurethane resin. Among these, for example, an amorphous polyester resin and an amorphous vinyl resin (particularly, a styrene acrylic resin) are preferable, and an amorphous polyester resin is more preferable.

Amorphous Polyester Resin

Examples of the amorphous polyester resin include a polycondensate of a polyvalent carboxylic acid and a polyhydric alcohol. As the amorphous polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the amorphous polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K7121-1987, "Testing methods for transition temperatures of plastics".

The weight-average molecular weight (Mw) of the amorphous polyester resin is, for example, preferably 5,000 or more and 1,000,000 or less, and more preferably 7,000 or more and 500,000 or less.

The number-average molecular weight (Mn) of the amorphous polyester resin is, for example, preferably 2,000 or more and 100,000 or less.

The molecular weight distribution Mw/Mn of the amorphous polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC-HCL-8120GPC manufactured by Tosoh Corporation as a measurement device, TSKgel•Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The amorphous polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is being distilled off. In a case where a monomer with poor compatibility takes part in the reaction, for example, the monomer with poor compatibility may be condensed in advance with an acid or an alcohol that is to be polycondensed with the monomer, and then polycondensed with the major component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Specific Resin Particles

The specific resin particles are not particularly limited, and may be resin particles having the storage modulus G' of $1\times10^5$ Pa or more and $5\times10^7$ Pa or less in a range of 30° C. or higher and 180° C. or lower in dynamic viscoelasticity measurement at a heating rate of 2° C./min.

The storage modulus G' of the specific resin particles in a range of 30° C. or higher and 180° C. or lower is, for example, preferably $1\times10^5$ Pa or more and $2\times10^7$ Pa or less, and more preferably $1\times10^5$ Pa or more and $1\times10^7$ Pa or less.

In a case where the resin particles having the storage modulus G' that falls into the above range in a range of 30° C. or higher and 180° C. or lower are used, an excessive reduction of image density in a low application region of a fixed image is further suppressed, than in a case where resin particles having the storage modulus G' lower than the above range is used. As a result, the image density unevenness is further reduced. Furthermore, in a case where the resin particles having the storage modulus G' that falls into the above range in a range of 30° C. or higher and 180° C. or lower are used, deterioration of fixability resulting from excessively high elasticity of toner particles is further suppressed, and better fixability is likely to obtained, than in a case where resin particles having the storage modulus G' lower than the above range are used.

A loss tangent tan δ of the specific resin particles in a range of 30° C. or higher and 180° C. or lower that is determined, for example, by measuring dynamic viscoelasticity of the specific resin particles at a heating rate of 2° C./min is, for example, preferably 0.01 or more and 2.5 or less. Especially, in a range of 65° C. or higher and 150° C. or lower, the loss tangent tan δ of the specific resin particles is, for example, more preferably 0.01 or more and 1.0 or less, and even more preferably 0.01 or more and 0.5 or less.

In a case where the loss tangent tan δ of the specific resin particles falls into the above range in a range of 30° C. or higher and 180° C. or lower, the toner particles are more likely to be deformed during fixing, and better fixability is likely to be obtained, than in a case where the loss tangent tan δ of the specific resin particles is lower than the above range in a range of 30° C. or higher and 150° C. or lower. Furthermore, in a case where the loss tangent tan δ of the specific resin particles in a range of 65° C. or higher and 180° C. or lower, which is the temperature at which the toner particles are more likely to be deformed, falls into the above range, an excessive reduction of image density in a low application region of a fixed image is further suppressed, than in a case where the loss tangent tan δ of the specific resin particles is higher than the above range. As a result, the image density unevenness is further reduced.

The specific resin particles are, for example, preferably crosslinked resin particles.

"Crosslinked resin particles" refer to resin particles having a bridging structure between specific atoms in the polymer structure contained in the resin particles.

In a case where crosslinked resin particles are used as the specific resin particles, the storage modulus G' of the specific resin particles is likely to fall into the above range in a range of 30° C. or higher and 180° C. or lower, and the specific toner is easily obtained.

Examples of the crosslinked resin particles include crosslinked resin particles crosslinked by ionic bonds (ionically crosslinked resin particles), crosslinked resin particles crosslinked by covalent bonds (covalently crosslinked resin particles), and the like. As the crosslinked resin particles, among these, for example, crosslinked resin particles crosslinked by covalent bonds are preferable.

The types of resin used for the crosslinked resin particles include a polyolefin-based resin (such as polyethylene or polypropylene), a styrene-based resin (such as polystyrene or α-polymethylstyrene), a (meth)acrylic resin (such as polymethyl methacrylate or polyacrylonitrile), an epoxy resin, a polyurethane resin, a polyurea resin, a polyamide resin, a polycarbonate resin, a polyether resin, a polyester resin, and copolymer resins of these. As necessary, each of these resins may be used alone, or two or more of these resins may be used in combination.

As the resin used for the crosslinked resin particles, among the above resins, for example, a styrene-(meth) acrylic copolymer resin is preferable.

That is, as the crosslinked resin particles, for example, styrene-(meth)acrylic copolymer resin particles are preferable.

In a case where styrene-(meth)acrylic copolymer resin particles are used as the crosslinked resin particles, the storage modulus G' of the specific resin particles is likely to fall into the above range in a range of 30° C. or higher and 180° C. or lower, and the specific toner is easily obtained.

Examples of the styrene-(meth)acrylic copolymer resin include resins obtained by polymerizing the following styrene-based monomer and (meth)acrylic monomer by radical polymerization.

Examples of the styrene-based monomer include styrene, α-methylstyrene, vinylnaphthalene, alkyl-substituted styrene having an alkyl chain, such as 2-methylstyrene, 3-methylstyrene, 4-methylstyrene, 2-ethylstyrene, 3-ethylstyrene, and 4-ethylstyrene, halogen-substituted styrene such as 2-chlorostyrene, 3-chlorostyrene, and 4-chlorostyrene, fluorine-substituted styrene such as 4-fluorostyrene and 2,5-difluorostyrene, and the like. Among these, for example, styrene and α-methylstyrene are preferable.

Examples of the (meth)acrylic monomer include (meth) acrylic acid, n-methyl (meth)acrylate, n-ethyl (meth)acrylate, n-propyl (meth)acrylate, n-butyl (meth)acrylate, n-pentyl (meth)acrylate, n-hexyl (meth)acrylate, n-heptyl (meth) acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth) acrylate, amyl (meth)acrylate, neopentyl (meth)acrylate, isohexyl (meth)acrylate, isoheptyl(meth)acrylate, isooctyl (meth)acrylate, 2-ethylhexyl (meth)acrylate, phenyl (meth) acrylate, biphenyl (meth)acrylate, diphenyl ethyl (meth) acrylate, t-butylphenyl (meth)acrylate, terphenyl (meth) acrylate, cyclohexyl (meth)acrylate, t-butylcyclohexyl (meth)acrylate, dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, (meth)acrylonitrile, (meth)acrylamide, and the like. Among these, for example, n-butyl (meth)acrylate and (3-carboxyethyl (meth)acrylate are preferable.

Examples of crosslinking agents for crosslinking the resin in the crosslinked resin particles include aromatic polyvinyl compounds such as divinylbenzene and divinylnaphthalene; polyvinyl esters of aromatic polyvalent carboxylic acids, such as divinyl phthalate, divinyl isophthalate, divinyl terephthalate, divinyl homophthalate, divinyl trimesate, trivinyl trimesate, divinyl naphthalenedicarboxylate, and divinyl biphenylcarboxylate; divinyl esters of nitrogen-containing aromatic compounds, such as divinyl pyridine dicarboxylate; vinyl esters of unsaturated heterocyclic compound carboxylic acid, such as vinyl pyromucate, vinyl furan carboxylate, vinyl pyrrole-2-carboxylate, and vinyl thiophene carboxylate; (meth)acrylic acid esters of linear polyhydric alcohols, such butanediol diacrylate, butanediol dimethacrylate, hexanediol diacrylate, octanediol dimethacrylate, decanediol diacrylate, and dodecanediol dimethacrylate; (meth)acrylic acid esters of branched substituted polyhydric alcohols, such as neopentylglycol dimethacrylate and 2-hydroxy-1,3-diacryloxypropane; polyvinyl esters of polyvalent carboxylic acids, such as polyethylene glycol di(meth)acrylate, polypropylene polyethylene glycol di(meth)acrylates, divinyl succinate, divinyl fumarate, vinyl maleate, divinyl maleate, divinyl diglycolate, vinyl itaconate, divinyl itaconate, divinyl acetone dicarboxylate, divinyl glutarate, 3,3'-divinylthiodipropionate, divinyl trans-aconitate, trivinyl trans-aconitate, divinyl adipate, divinyl pimelate, divinyl suberate, divinyl azelate, divinyl sebacate, divinyl dodecanedioate, and divinyl brassylate, and the like. One kind of crosslinking agent may be used alone, or two or more kinds of crosslinking agents may be used in combination.

In a case where the specific resin particles are a polymer of a composition for forming specific resin particles containing a styrene-based monomer, a (meth)acrylic monomer, and a crosslinking agent, the amount of the crosslinking agent contained in the composition may be adjusted so that the viscoelasticity of the specific resin particles is controlled. For example, increasing the amount of the crosslinking agent contained in the composition makes it easy to obtain resin particles having a high storage modulus G'. The content of the crosslinking agent in the composition for forming specific resin particles with respect to, for example, a total of 100 parts by mass of the styrene-based monomer, the (meth)acrylic monomer, and the crosslinking agent is preferably 0.3 parts by mass or more and 5.0 parts by mass or less, more preferably 0.5 parts by mass or more and 2.5 parts by mass or less, and even more preferably 1.0 part by mass or more and 2.0 parts by mass or less.

The number-average particle size of the specific resin particles is, for example, preferably 60 nm or more and 300 nm or less, more preferably 100 nm or more and 200 nm or less, and even more preferably 130 nm or more and 170 nm or less.

In a case where the number-average particle size of the specific resin particles is in the above range, deterioration of fixability resulting from the fact that the toner particles are easily affected by high elasticity of the specific resin particles is further suppressed, and better fixability is obtained, than in a case where the number-average particle size of the specific resin particles is smaller than the above range. Furthermore, in a case where the number-average particle size of the specific resin particles is in the above range, the specific resin particles are likely to be practically evenly dispersed in the toner particles, which makes it easier to obtain a toner with viscoelasticity having weak temperature dependence and weak strain dependence, than in a case where the number-average particle size of the specific resin particles is larger than the above range. As a result, the image density unevenness is reduced.

The number-average particle size of the specific resin particles is a value measured using a transmission electron microscope (TEM).

As the transmission electron microscope, for example, JEM-1010 manufactured by JEOL Ltd. DATUM Solution Business Operations can be used.

Hereinafter, a method for measuring the number-average particle size of the specific resin particles will be specifically described.

The toner particles are cut in a thickness of about 0.3 μm with a microtome. The cross section of the toner particles is imaged at 4,500× magnification by using a transmission electron microscope, equivalent circular diameters of 1,000 resin particles dispersed in the toner particles are calculated based on the cross-sectional areas of the particles, and an arithmetic mean thereof is calculated and adopted as the number-average particle size.

For example, it is preferable that the specific resin particles exist in the toner particles in a state of being extremely excellently dispersed in the toner particles while forming a domain. In a case where the specific resin particles exist in the toner particles in this way, the image density unevenness is further reduced, for example, than in a case where the specific resin particles exist in a state of being unevenly distributed in the toner particles without forming a domain. For example, in a case where only the central region contains the specific resin particles, the specific resin particles are likely to be unevenly distributed in the fixed toner image, and the portion where the specific resin particles exist tends to have high elasticity. As a result, sometimes the portion where no specific resin particles exist has low elasticity, which leads to an increase in image density unevenness. Furthermore, in a case where the specific resin particles do not form a domain, the content of components excluding the specific resin particles increases, and the physical properties of such components are dominant. Accordingly, the effect of reducing image density unevenness is reduced. Presumably, consequently, in a case where the specific resin particles exist in the toner particles in a state of being extremely excellently dispersed in the toner particles while forming a domain, unlike the case where only the central region contains the specific resin particles, the image density unevenness may be reduced.

The content of the specific resin particles with respect to the total mass of the toner particles is, for example, preferably 2% by mass or more and 30% by mass or less, more preferably 5% by mass or more and 25% by mass or less, and even more preferably 8% by mass or more and 20% by mass or less.

In a case where the content of the specific resin particles is in the above range, compared to a case where the content of the specific resin particles is smaller than the above range, a toner with viscoelasticity having weak temperature dependence and weak strain dependence is more likely to be obtained, and the image density unevenness is further reduced. Furthermore, in a case where the ratio of the specific resin particles contained in the toner particles is in the above range, deterioration of fixability resulting from excessively high elasticity of the toner particles is further suppressed, and excellent fixability is more likely to be obtained, than in a case where the ratio of the specific resin particles contained in the toner particles is higher than the above range.

Colorant

Examples of colorants include various pigments such as carbon black, chrome yellow, Hansa yellow, benzidine yellow, indanthrene yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye, and the like.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the total mass of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral•petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Other Additives

Examples of other additives include well-known additives such as a magnetic material, a charge control agent, and inorganic powder. These additives are incorporated into the toner particles as internal additives.

Relationship of Composition in Toner Particles $$\text{Difference}(SP\ \text{value}(S)-SP\ \text{value}(R))$$

A difference between an SP value (S) as a solubility parameter of the specific resin particles and an SP value (R) as a solubility parameter of the binder resin (SP value (S)−SP value (R)) is, for example, preferably −0.32 or more and −0.12 or less.

In a case where the difference (SP value (S)−SP value (R)) is in the above range, the specific resin particles are more likely to be practically evenly dispersed in the toner particles, and it is easier to control the way the specific resin particles exist, than in a case where the difference (SP value (S)−SP value (R)) is smaller than the above range. Accordingly, allowing the specific resin particles to exist in the toner particles in a state of being extremely excellently dispersed in the toner particles makes it easy to obtain a toner with viscoelasticity having weak temperature dependence and weak strain dependence and further reduces the image density unevenness.

Furthermore, in a case where the difference (SP value (S)−SP value (R)) is in the above range, an increase in overall melt viscosity of the toner resulting from a phenomenon where the specific resin particles and the binder resin are excessively mixed together and excessively compatible with each other when the toner melts is further suppressed, than in a case where the difference (SP value (S)−SP value (R)) is larger than the above range. As a result, deterioration of fixability resulting from excessively high viscoelasticity is suppressed, which brings an advantage of being capable of obtaining excellent fixability.

In a case where the binder resin is a mixed resin, a solubility parameter of a resin contained in the binder resin at the highest proportion is adopted as the SP value (R).

The difference (SP value (S)−SP value (R)) is, for example, more preferably −0.32 or more and −0.12 or less, and even more preferably −0.29 or more and −0.18 or less.

The SP value (S) as a solubility parameter of the specific resin particles is, for example, preferably 9.00 or more and 9.15 or less, more preferably 9.03 or more and 9.12 or less, and even more preferably 9.06 or more and 9.10 or less.

The SP value (S) as a solubility parameter of the specific resin particles and the SP value (R) as a solubility parameter of the binder resin (unit: $(cal/cm^3)^{1/2}$) is calculated by the Okitsu method. Details of the Okitsu method are described in "Journal of the Adhesion Society of Japan, Vol. 29, No. 5 (1993)".

Viscoelasticity of Components (Extra Components) Excluding Specific Resin Particles For instance, it is preferable that the storage modulus G' of components of the toner particles excluding the specific resin particles be $1\times10^8$ Pa or more in a range of 30° C. or higher and 50° C. or lower, and that a temperature at which the storage modulus G' of such components reaches a value less than $1\times10^5$ be 65° C. or higher and 90° C. or lower. Hereinafter, the components of the toner particles excluding the specific resin particles will be also called "extra components", and the temperature at which the storage modulus G' of the extra components reaches a value less than $1\times10^5$ Pa will be also called "specific elastic modulus achieving temperature". The extra components having the storage modulus G' satisfying the above conditions have a high elastic modulus at a low temperature and a low elastic modulus at a temperature of 65° C. or higher and 90° C. or lower. Therefore, in a case where the storage modulus G' of the extra component satisfies the above conditions, the toner particles more readily melt by heating, and better fixability is obtained, than in a case where the temperature at which the storage modulus G' of the extra components reaches a value less than $1\times10^5$ Pa is higher than 90° C.

The storage modulus G' of the extra components in a range of 30° C. or higher and 50° C. or lower is, for example, preferably $1\times10^8$ Pa or more, more preferably $1\times10^8$ Pa or more and $1\times10^9$ Pa or less, and even more preferably $2\times10^8$ Pa or more and $6\times10^8$ Pa or less.

In a case where the storage modulus G' of the extra component in a range of 30° C. or higher and 50° C. or lower is in the above range, the storage stability of the toner is further improved than in a case where the storage modulus G' of the extra component in a range of 30° C. or higher and 50° C. is lower than the above range, and better fixability is likely to be obtained than in a case where the storage modulus G' of the extra component in a range of 30° C. or higher and 50° C. is higher than the above range.

The specific elastic modulus achieving temperature of the extra components is, for example, preferably 65° C. or higher and 90° C. or lower, more preferably 68° C. or higher and 80° C. or lower, and even more preferably 70° C. or higher and 75° C. or lower.

In a case where the specific elastic modulus achieving temperature of the extra component is in the above range, the storage stability of the toner is further improved than in a case where the specific elastic modulus achieving temperature of the extra component is lower than the above range, and the obtained fixability is likely to be better than in a case where the specific elastic modulus achieving temperature of the extra component is higher than the above range.

The loss tangent tan δ of the extra components at the specific elastic modulus achieving temperature is, for example, preferably 0.8 or more and 1.6 or less, more preferably 0.9 or more and 1.5 or less, and even more preferably 1.0 or more and 1.4 or less.

In a case where the loss tangent tan δ of the extra component at the specific elastic modulus achieving temperature is in the above range, the obtained fixability is likely to be better than in a case where the loss tangent tan δ of the extra component at the specific elastic modulus achieving temperature is lower than the above range. In a case where the loss tangent tan δ of the extra components at the specific elastic modulus achieving temperature is in the above range, the image density unevenness tends to be further reduced, than in a case where the loss tangent tan δ of the extra components at the specific elastic modulus achieving temperature is higher than the above range.

The storage modulus G' and the loss tangent tan δ of the extra component are determined as follows.

Specifically, first, only the extra components excluding the resin particles are isolated from the toner particles and molded into tablets at 25° C. by a press molding machine, thereby preparing a measurement sample. Examples of the method for isolating only the extra components excluding the resin particles from the toner particles include a method of immersing the toner particles in a solvent that dissolves the binder resin but does not dissolve the resin particles and isolating the extra components by extraction.

Then, the obtained measurement sample is interposed between parallel plates having a diameter of 8 mm, and dynamic viscoelasticity is measured under the following conditions by raising the measurement temperature from 30° C. to 150° C. at 2° C./min at a strain of 0.1% to 100%. From each of the storage modulus and loss modulus curves obtained by the measurement, the storage modulus G' and the loss tangent tan δ are determined.

Measurement Condition

Measurement device: rheometer ARES-G2 (manufactured by TA Instruments)

Fixture: 8 mm parallel plates

Gap: adjusted to 3 mm

Frequency: 1 Hz

Relationship Between Specific Resin Particles and Extra Components

In a case where log G'p represents a common logarithm of the storage modulus G' of the specific resin particles in a range of 90° C. or higher and 180° C. or lower, and log G'r represents a common logarithm of the storage modulus G' of the extra components in a range of 90° C. or higher and 180° C. or lower, a value of log G'p−log G'r is, for example, preferably 1.0 or more and 3.5 or less. The value of log G'p−log G'r is, for example, more preferably 1.1 or more and 3.4 or less, and even more preferably 1.2 or more and 3.3 or less.

In a case where the value of log G'p−log G'r is in the above range, excellent fixability and reduction of image density unevenness are more likely to be simultaneously achieved, than in a case where the value of log G'−log G'r is smaller than the above range and a case where the value of log G'−log G'r is larger than the above range.

Characteristics of Toner Particles and the Like

The toner particles may be toner particles that have a single-layer structure or toner particles having a so-called core•shell structure that is configured with a core portion (core particle) and a coating layer (shell layer) covering the core portion.

The toner particles having a core•shell structure may, for example, be configured with a core portion that is configured with a binder resin, specific resin particles, and other additives used as necessary, such as a colorant and a release agent, and a coating layer that is configured with a binder resin and specific resin particles.

In a case where each of the toner particles is a core•shell structure, for example, it is preferable that at least the core particle contain the specific resin particles, and both the core particle and the shell layer may contain the specific resin particles. In a case where both the core particle and the shell layer contain the specific resin particles, from the viewpoint of further reducing image density unevenness by extremely excellently dispersing the specific resin particles in the toner particles, for example, it is preferable that the content of the specific resin particles be the same for the core particle and the shell layer.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% aqueous solution of a surfactant (preferably sodium alkylbenzene sulfonate, for example) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are drawn from small-sized particles. The particle size at which the cumulative proportion of particles is 16% is defined as volume-based particle size D16v and a number-based particle size D16p. The particle size at which the cumulative proportion of particles is 50% is defined as volume-average particle size D50v and a cumulative number-average particle size D50p. The particle size at which the cumulative proportion of particles is 84% is defined as volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The average circularity of the toner particles is, for example, preferably 0.94 or more and 1.00 or less, and more preferably 0.95 or more and 0.98 or less.

The average circularity of the toner particles is determined by (circular equivalent perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for obtaining the average circularity is 3,500.

In a case where a toner contains external additives, the toner (developer) as a measurement target is dispersed in water containing a surfactant, then the dispersion is treated with ultrasonic waves so that the external additives are removed, and the toner particles are collected.

External Additive

Examples of the external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, $MgSO_4$, and the like.

The surface of the inorganic particles as an external additive may have undergone, for example, a hydrophobizing treatment. The hydrophobizing treatment is performed, for example, by immersing the inorganic particles in a hydrophobing agent. The hydrophobing agent is not particularly limited, and examples thereof include a silane-based coupling agent, silicone oil, a titanate-based coupling agent, an aluminum-based coupling agent, and the like. One kind of each of these agents may be used alone, or two or more kinds of these agents may be used in combination.

Usually, the amount of the hydrophobing agent is, for example, 1 part by mass or more and 10 parts by mass or less with respect to 100 parts by mass of the inorganic particles.

Examples of external additives also include resin particles (resin particles such as polystyrene, polymethylmethacrylate (PMMA), and melamine resins), a cleaning activator (for example, a metal salt of a higher fatty acid represented by zinc stearate or fluorine-based polymer particles), and the like.

The amount of the external additives added to the exterior of the toner particles with respect to the toner particles is, for example, preferably 0.01% by mass or more and 5% by mass or less, and more preferably 0.01% by mass or more and 2.0% by mass or less.

Manufacturing Method of Toner

Next, the manufacturing method of the toner according to the present exemplary embodiment will be described. The toner according to the present exemplary embodiment is obtained by manufacturing toner particles and then adding external additives to the exterior of the toner particles as necessary.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). The manufacturing method of the toner particles is not particularly limited to these manufacturing methods, and a well-known manufacturing method is adopted.

Among the above methods, for example, the aggregation and coalescence method may be used for obtaining toner particles.

Specifically, for example, in a case where the toner particles are manufactured by the aggregation and coalescence method.

The toner particles are manufactured through a step of preparing a resin particle dispersion in which resin particles to be a binder resin are dispersed and a specific resin particle dispersion to be specific resin particles (a resin particle dispersion-preparing step), a step of allowing the resin particles (plus other particles as necessary) to be aggregated in the resin particle dispersion (having been mixed with another resin particle dispersion as necessary) so as to form aggregated particles (aggregated particle forming step), and a step of heating an aggregated particle dispersion in which the aggregated particles are dispersed so as to allow the aggregated particles to undergo fusion•coalescence and to form toner particles (fusion•coalescence step).

Hereinafter, each of the steps will be specifically described.

In the following section, a method for obtaining toner particles containing a colorant and a release agent will be described. The colorant and the release agent are used as necessary. It goes without saying that other additives different from the colorant and the release agent may also be used.

Resin Particle Dispersion-Preparing Step

First, for example, a colorant particle dispersion in which colorant particles are dispersed and a release agent particle dispersion in which release agent particles are dispersed are prepared together with the resin particle dispersion in which resin particles to be a binder resin are dispersed.

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the resin particle dispersion by using, for example, a transitional phase inversion emulsification method.

The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), so that the resin undergoes conversion (so-called phase transition) from W/O to O/W, turns into a discontinuous phase, and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

Preparation of Specific Resin Particle Dispersion

As a method for preparing the specific resin particle dispersion, for example, known methods such as an emulsion polymerization method, a melt kneading method using a Banbury mixer or a kneader, a suspension polymerization method, and a spray drying method are used. Among these, for example, an emulsion polymerization method is preferable.

From the viewpoint of making the storage modulus G' and the loss tangent tan δ of the specific resin particles fall into the preferable range, for example, it is preferable to use a styrene-based monomer and a (meth)acrylic monomer as monomers and polymerize these in the presence of a crosslinking agent.

Furthermore, in manufacturing the specific resin particles, for example, it is preferable to perform emulsion polymerization a plurality of times.

Hereinafter, a method for manufacturing the specific resin particles will be specifically described.

The method for preparing the specific resin particle dispersion preferably includes, for example, a step of obtaining an emulsion containing a monomer, a crosslinking agent, a surfactant, and water (emulsion preparation step), a step of adding a polymerization initiator to the emulsion and heating the emulsion so as to polymerize the monomer (first emulsion polymerization step), and a step of adding an emulsion containing a monomer and a crosslinking agent to a reaction solution obtained after the first emulsion polymerization step and heating the solution so as to polymerize the monomer (second emulsion polymerization step).

Emulsion Preparation Step

This is a step of obtaining an emulsion containing a monomer, a crosslinking agent, a surfactant, and water.

For example, it is preferable to obtain the emulsion by emulsifying a monomer, a crosslinking agent, a surfactant, and water by using an emulsifying machine.

Examples of the emulsifying machine include a rotary stirrer equipped with a propeller type, anchor type, paddle type, or turbine type stirring blade, a stationary mixer such as a static mixer, and a rotor•stator type emulsifying machine such as a homogenizer or Clare mix, a mill type emulsifying machine having grinding function, a high-pressure emulsifying machine such as a Munton Gorlin-type pressure emulsifying machine, a high-pressure nozzle type emulsifying machine that causes cavitation under high pressure, a high-pressure impact-type emulsifying machine, such as a microfluidizer, which generates shearing force by causing collision of liquids under high pressure, an ultrasonic emulsifying machine that causes cavitation by using ultrasonic waves, a membrane emulsifying machine that performs uniform emulsification through pores, and the like.

As the monomers, for example, it is preferable to use a styrene-based monomer and a (meth)acrylic monomer.

As the crosslinking agent, the aforementioned crosslinking agent is used.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. The nonionic surfactant may be used in combination with an anionic surfactant or a cationic surfactant. Among these, an anionic surfactant is preferable, for example. One kind of surfactant may be used alone, or two or more kinds of surfactants may be used in combination.

The emulsion may contain a chain transfer agent. The chain transfer agent is not particularly limited. As the chain transfer agent, a compound having a thiol component can be used. Specifically, for example, alkyl mercaptans such as hexyl mercaptan, heptyl mercaptan, octyl mercaptan, nonyl mercaptan, decyl mercaptan, and dodecyl mercaptan are preferable.

From the viewpoint of making the storage modulus G' and the loss tangent tan δ of the specific resin particles fall into the preferable range, a mass ratio of the styrene-based monomer to the (meth)acrylic monomer in the emulsion (styrene-based monomer/(meth)acrylic monomer) is, for example, preferably 0.2 or more and 1.1 or less.

Furthermore, from the viewpoint of making the storage modulus G' and the loss tangent tan δ of the specific resin particles fall into the preferable range, the content of the crosslinking agent is, for example, preferably 0.5% by mass or more and 3% by mass or less with respect to the total mass of the emulsion.

First Emulsion Polymerization Step

This is a step of adding a polymerization initiator to the emulsion and heating the emulsion so as to polymerize the monomers.

In polymerizing the monomers, for example, it is preferable to stir the emulsion (reaction solution) containing the polymerization initiator with a stirrer.

Examples of the stirrer include a rotary stirrer equipped with a propeller type, anchor type, paddle type, or turbine type stirring blade.

As the polymerization initiator, for example, it is preferable to use ammonium persulfate.

In a case where a polymerization initiator is used, the amount of the polymerization initiator added may be adjusted so that the viscoelasticity of the obtained specific resin particles is controlled. For example, reducing the amount of the polymerization initiator added makes it easy to obtain resin particles having a high storage modulus G'.

Second Emulsion Polymerization Step

This is a step of adding an emulsion containing monomers to the reaction solution obtained after the first emulsion polymerization step and heating the reaction solution so as to polymerize the monomers.

In polymerizing the monomers, for example, it is preferable to stir the reaction solution as in the first emulsion polymerization step.

In this step, the time required for adding the emulsion containing the monomers may be adjusted so that the viscoelasticity of the obtained specific resin particles is controlled. For example, increasing the time required for adding the emulsion containing the monomers makes it easy to obtain resin particles having a high storage modulus G'. The time required for adding the emulsion containing the monomers is, for example, in a range of 2 hours or more and 5 hours or less.

Furthermore, in this step, the temperature at which the reaction solution is stirred may be adjusted so that the viscoelasticity of the obtained specific resin particles is controlled. For example, reducing the temperature at which the reaction solution is stirred makes it easy to obtain resin particles having a high storage modulus G'. The temperature at which the reaction solution is stirred is, for example, in a range of 55° C. or higher and 75° C. or lower.

For instance, it is preferable to obtain the emulsion containing monomers by emulsifying monomers, a surfactant, and water by using an emulsifying machine.

Aggregated Particle Forming Step

Next, the resin particle dispersion is mixed with the colorant particle dispersion, the release agent particle dispersion, and the specific resin particle dispersion.

Then, in the mixed dispersion, the resin particles, the colorant particles, the release agent particles, and the specific resin particles are hetero-aggregated so that aggregated particles are formed which have a diameter close to the diameter of the target toner particles and include the resin particles, the colorant particles, the release agent particles, and the specific resin particles.

Specifically, for example, an aggregating agent is added to the mixed dispersion, the pH of the mixed dispersion is adjusted so that the dispersion is acidic (for example, pH of 2 or higher and 5 or lower), and a dispersion stabilizer is added thereto as necessary. Then, the dispersion is heated to the glass transition temperature of the resin particles (specifically, for example, to a temperature equal to or higher than the glass transition temperature of the resin particles—30° C. and equal to or lower than the glass transition temperature of the resin particles—10° C.) so that the particles dispersed in the mixed dispersion are aggregated, thereby forming aggregated particles.

In the aggregated particle forming step, for example, in a state where the mixed dispersion is being stirred with a rotary shearing homogenizer, an aggregating agent may be added thereto at room temperature (for example, 25° C.), the pH of the mixed dispersion may be adjusted so that the dispersion is acidic (for example, pH of 2 or higher and 5 or lower), a dispersion stabilizer may be added to the dispersion as necessary, and then the dispersion may be heated.

In this step, the temperature of the mixed dispersion to which the aggregating agent is added may be adjusted so that the dispersion state of the specific resin particles in the obtained toner particles is controlled. For example, reducing the temperature of the mixed dispersion enables the specific resin particles to exhibit excellent dispersibility. The temperature of the mixed dispersion is, for example, in a range of 5° C. or higher and 40° C. or lower.

Furthermore, in this step, the stirring rate after the addition of the aggregating agent may be adjusted so that the dispersion state of the specific resin particles in the obtained toner particles is controlled. For example, increasing the stirring rate after the addition of the aggregating agent enables the specific resin particles to exhibit excellent dispersibility.

Examples of the aggregating agent include a surfactant having polarity opposite to the polarity of the surfactant used as a dispersant added to the mixed dispersion, an inorganic metal salt, and a metal complex having a valency of 2 or higher. Particularly, in a case where a metal complex is used as the aggregating agent, the amount of the surfactant used is reduced, and the charging characteristics are improved.

An additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA), and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Fusion•Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) so that the aggregated particles are fused and coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed and a specific resin particle dispersion in which the specific resin particles are dispersed so as to cause the resin particles and the specific resin particles to be aggregated and adhere to the surface of the aggregated particles and to form second aggregated particles, and a step of heating a second aggregated particle dispersion in which the second aggregated particles are dispersed so as to cause the second aggregated particles to be fused and coalesce and to form toner particles having a core/shell structure.

In the step of forming second aggregated particles, the addition of the resin particle dispersion and the specific resin particle dispersion and the adhesion of the resin particles and the specific resin particles to the surface of the aggregated particles may be repeated a plurality of times. In a case where these operations are repeated a plurality of times, toner particles are obtained in which the specific resin particles are evenly incorporated into both the surface region and the central region of the toner particles.

In the fusion•coalescence step, the heating temperature or heating time may be adjusted so that the state of domain of the specific resin particles in the obtained toner particles (more specifically, the way the specific resin particles are dispersed in the toner particles) is controlled. For example, lengthening the heating time causes the specific resin particles to be aggregated in the toner particles and to readily form a strong domain. Furthermore, the dispersibility of the specific resin particles is further controlled, and toner particles to which the specific resin particles make a great contribution can be formed. In addition, performing fusion•coalescence at a higher temperature (for example, a temperature higher than the glass transition temperature of the resin particles by at least 30° C.) enables the specific resin particles to form a strong domain as described above.

After the fusion•coalescence step, the toner particles formed in a solution undergo known washing step, solid-liquid separation step, and drying step, thereby obtaining dry toner particles.

The washing step is not particularly limited. However, in view of charging properties, for example, displacement washing may be thoroughly performed using deionized water. The solid-liquid separation step is not particularly limited. However, in view of productivity, for example, suction filtration, pressure filtration, or the like may be performed. Furthermore, the method of the drying step is not particularly limited. However, in view of productivity, freeze drying, flush drying, fluidized drying, vibratory fluidized drying, or the like may be performed.

Then, for example, by adding an external additive to the obtained dry toner particles and mixing together the external additive and the toner particles, the toner according to the present exemplary embodiment is manufactured. The mixing may be performed, for example, using a V blender, a Henschel mixer, a Lodige mixer, or the like. Furthermore, coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a coating resin; a magnetic powder dispersion-type carrier obtained by dispersing magnetic powder in a matrix resin and mixing the powder and the resin together; a resin impregnation-type carrier obtained by impregnating porous magnetic powder with a resin; and the like.

Each of the magnetic powder dispersion-type carrier and the resin impregnation-type carrier may be a carrier obtained by coating a core material, which is particles configuring the carrier, with a coating resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like.

The coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a coating resin, for example, by a coating method using a solution for forming a coating layer obtained by dissolving the coating resin and various additives, which are used as necessary, in an appropriate solvent, and the like. The solvent is not particularly limited, and may be selected in consideration of the type of the coating resin used, coating suitability, and the like.

Specifically, examples of the resin coating method include a dipping method of dipping the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and removing solvents; and the like.

The mixing ratio (mass ratio) between the toner and the carrier, represented by toner:carrier, in the two-component developer is, for example, preferably 1:100 to 30:100, and more preferably 3:100 to 20:100.

Image Forming Apparatus/Image Forming Method

The image forming apparatus/image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In the case of the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) to be attached to and detached from the image forming apparatus. As the process cartridge, for example, a process cartridge is used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming means) adopting an electrophotographic method that output images of colors, yellow (Y), magenta (M), cyan (C), and black (K), based on color-separated image data. These image forming units (hereinafter, simply called “units” in some cases) 10Y, 10M, 10C, and 10K are arranged in a row in the horizontal direction in a state of being spaced apart by a predetermined distance. The units 10Y, 10M, 10C, and 10K may be process cartridges that are attached to and detached from the image forming apparatus.

An intermediate transfer belt 20 as an intermediate transfer member passing through the units 10Y, 10M, 10C, and 10K extends above the units in the drawing. The intermediate transfer belt 20 is looped over a driving roll 22 and a support roll 24 which is in contact with the inner surface of the intermediate transfer belt 20, the rolls 22 and 24 being spaced apart in the horizontal direction in the drawing. The intermediate transfer belt 20 is designed to run in a direction toward the fourth unit 10K from the first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the surface of the intermediate transfer belt 20 on the image holder side.

Toners including toners of four colors, yellow, magenta, cyan, and black, stored in toner cartridges 8Y, 8M, 8C, and 8K are supplied to developing devices (developing units) 4Y, 4M, 4C, and 4K of units 10Y, 10M, 10C, and 10K, respectively.

The first to fourth units 10Y, 10M, 10C, and 10K have the same configuration. Therefore, in the present specification, as a representative, the first unit 10Y will be described which is placed on the upstream side of the running direction of the intermediate transfer belt and forms a yellow image. Reference numerals marked with magenta (M), cyan (C), and black (K) instead of yellow (Y) are assigned in the same portions as these in the first unit 10Y, so that the second to fourth units 10M, 10C, and 10K will not be described again.

The first unit 10Y has a photoreceptor 1Y that acts as an image holder. Around the photoreceptor 1Y, a charging roll 2Y (an example of charging unit) that charges the surface of the photoreceptor 1Y at a predetermined potential, an exposure device 3 (an example of electrostatic charge image forming unit) that exposes the charged surface to a laser beam 3Y based on color-separated image signals so as to form an electrostatic charge image, a developing device 4Y (an example of developing unit) that develops the electrostatic charge image by supplying a charged toner to the electrostatic charge image, a primary transfer roll 5Y (an example of primary transfer unit) that transfers the developed toner image onto the intermediate transfer belt 20, and a photoreceptor cleaning device 6Y (an example of cleaning unit) that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. Furthermore, a bias power supply (not shown in the drawing) for applying a primary transfer bias is connected to each of primary transfer rolls 5Y, 5M, 5C, and 5K. Each bias power supply varies the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ωcm or less) substrate. The photosensitive layer has properties in that although this layer usually has a high resistance (resistance of a general resin), in a case where it is irradiated with the laser beam 3Y, the specific resistance of the portion irradiated with the laser beam changes. Therefore, via an exposure device 3, the laser beam 3Y is output to the surface of the charged photoreceptor 1Y according to the image data for yellow transmitted from the control unit not shown in the drawing. The laser beam 3Y is radiated to the photosensitive layer on the surface of the photoreceptor 1Y. As a result, an electrostatic charge image of a yellow image pattern is formed on the surface of the photoreceptor 1Y.

The electrostatic charge image is an image formed on the surface of the photoreceptor 1Y by charging. The electrostatic charge image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y is rotated to a predetermined development position as the photoreceptor 1Y runs. At the development position, the electrostatic charge image on the photoreceptor 1Y turns in to visible image (developed image) as a toner image by the developing device 4Y.

The developing device 4Y contains, for example, an electrostatic charge image developer that contains at least a yellow toner and a carrier. By being stirred in the developing device 4Y, the yellow toner undergoes triboelectrification, carries charges of the same polarity (negative charge) as the charges with which the surface of the photoreceptor 1Y is charged, and is held on a developer roll (an example of a developer holder). Then, as the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. For example, in the first unit 10Y, the transfer bias is set to +10 μA under the control of the control unit (not shown in the drawing).

Meanwhile, the residual toner on the photoreceptor 1Y is removed by a photoreceptor cleaning device 6Y and collected.

Furthermore, the primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of secondary transfer unit) disposed on the image holding surface side of the intermediate transfer belt 20. Meanwhile, via a supply mechanism, recording paper P (an example of recording medium) is supplied at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Then, the recording paper P is transported into a pressure contact portion (nip portion) of a pair of fixing rolls in the fixing device 28 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth, although the recording paper P is not particularly limited. For instance, coated paper prepared by coating the surface of plain paper with a resin or the like, art paper for printing, and the like are used.

The recording paper P on which the color image has been fixed is transported to an output portion, and a series of color image forming operations is finished.

Process Cartridge/Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing device and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
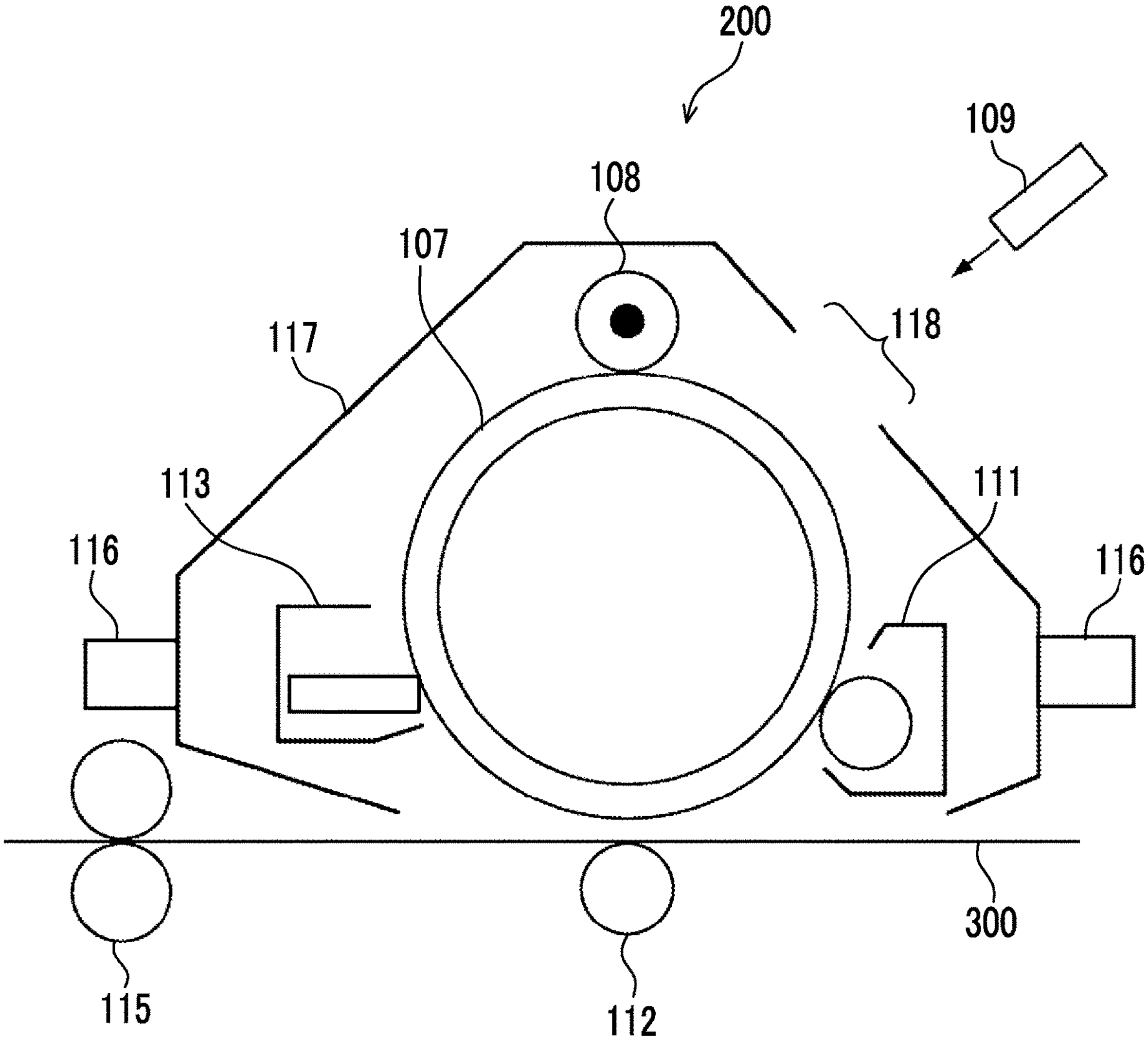
FIG. 2 is a view schematically showing the configuration of an example of a process cartridge detachable from the image forming apparatus according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of image holder), a charging roll 108 (an example of charging unit) that is provided on the periphery of the photoreceptor 107, a developing device 111 (an example of developing unit), a photoreceptor cleaning device 113 (an example of cleaning unit), which are integrally combined and held in the housing 117. The process cartridge 200 forms a cartridge in this way.

In FIG. 2, 109 represents an exposure device (an example of electrostatic charge image forming unit), 112 represents a transfer device (an example of transfer unit), 115 represents a fixing device (an example of fixing unit), and 300 represents recording paper (an example of recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective developing devices (colors) by a toner supply pipe not shown in the drawing. In a case where the amount of the toner contained in the container of the toner cartridge is low, the toner cartridge is replaced.

EXAMPLES

Examples will be described below, but the present invention is not limited to these examples. In the following description, unless otherwise specified, "parts" and "%" are based on mass in all cases.

Preparation of Specific Resin Particle Dispersion and Comparative Resin Particle Dispersion Preparation of Specific Resin Particle Dispersion 1

Styrene: 47.9 parts n-Butyl acrylate: 51.8 parts

β-Carboxyethyl acrylate: 0.3 parts

Anionic surfactant (Dowfax2A1 manufactured by The Dow Chemical Company): 0.8 parts Butanediol diacrylate (crosslinking agent): 1.65 parts The above raw materials are mixed together and dissolved, and 60 parts of deionized water is added thereto, followed by dispersion in the flask and emulsification, thereby preparing an emulsion.

Subsequently, 1.3 parts of an anionic surfactant (DOWFAX 2A1 manufactured by The Dow Chemical Company) is dissolved in 90 parts of deionized water, 1 part of the aforementioned emulsion is added thereto, and 10 parts of deionized water in which 5.4 parts of ammonium persulfate is dissolved is further added thereto.

Thereafter, the rest of the emulsion is added thereto for 180 minutes, the flask is cleaned out by nitrogen purging, then the solution in the flask is heated up to 65° C. in an oil bath while being stirred, the emulsion polymerization is continued as it is for 500 hours, and then the solid content thereof is adjusted to 24.5% by mass, thereby obtaining a specific resin particle dispersion 1.

Preparation of Specific Resin Particle Dispersions 2 to 9 and Comparative Resin Particle Dispersions C1 and C2

Specific resin particle dispersions 2 to 9 and comparative resin particle dispersions C1 and C2 are obtained in the same manner as that adopted for obtaining the specific resin particle dispersion 1, except that the amount of styrene added, the amount of n-butyl acrylate added, the amount of acrylic acid added, the amount of β-carboxyethyl acrylate added, the amount of the anionic surfactant to be dissolved in 90 parts of deionized water, the amount of butanediol diacrylate (crosslinking agent in the table) added, the amount of ammonium peroxide added, the temperature at which heating is performed in an oil bath (polymerization temperature in the table), the time required for the addition of the rest of the emulsion (addition time in the table), and the time for which the emulsion polymerization is continued after heating (retention time in the table) are set as shown in Table 1.

For the resin particles contained in each of the obtained specific resin particle dispersions and comparative resin particle dispersions, a minimum storage modulus G' ("G' (small)" in the table) and a maximum storage modulus G' ("G' (large)" in the table) at a temperature of 30° C. or higher and 180° C. or lower, a minimum loss tangent tan δ ("tan δ 30-180 (small)" in the table) and a maximum loss tangent tan δ ("tan δ 30-180 (large)" in the table) in a range of 30° C. or higher and 180° C. or lower, a minimum loss tangent tan δ ("tan δ 65-180 (small)" in the table) and a maximum loss tangent tan δ ("tan δ 65-180 (large)" in the table) in a range of 65° C. or higher and 180° C. or lower, the number-average particle size, and the SP value (S) are determined by the methods described above. The results are shown in Table 1.

TABLE 1

| Resin particle dispersion | Material | | | | | Crosslinking agent | Formulation | | |
|---|---|---|---|---|---|---|---|---|---|
| | Styrene (parts) | n-Butyl acrylate (parts) | Acrylic acid (parts) | β-Carboxyethyl acrylate (parts) | Anionic surfactant (parts) | Amount of addition (parts) | Ammonium persulfate (parts) | Polymerization temperature (° C.) | Addition time (min) |
| 1 | 47.9 | 51.8 | 0 | 0.3 | 2.1 | 1.65 | 5.4 | 65 | 180 |
| 2 | 50.8 | 48.9 | 0 | 0.3 | 1.9 | 1.65 | 4.3 | 62 | 180 |
| 3 | 47.9 | 51.8 | 0 | 0.3 | 1.6 | 0.51 | 8.7 | 72 | 180 |
| 4 | 47.9 | 51.8 | 0 | 0.3 | 2.5 | 1.65 | 11.2 | 75 | 180 |
| 5 | 47.9 | 51.8 | 0 | 0.3 | 2.3 | 3.10 | 6.1 | 65 | 180 |
| 6 | 47.9 | 51.8 | 0 | 0.3 | 1.2 | 1.65 | 5.4 | 65 | 180 |
| 7 | 47.9 | 51.8 | 0 | 0.3 | 2.9 | 1.65 | 5.4 | 65 | 180 |
| 8 | 47.9 | 51.8 | 0 | 0.3 | 1 | 1.65 | 5.4 | 65 | 180 |
| 9 | 47.9 | 51.8 | 0 | 0.3 | 3.1 | 1.65 | 5.4 | 65 | 180 |
| 10 | 46.8 | 48.9 | 2 | 0.3 | 2.1 | 1.65 | 5.4 | 65 | 180 |
| C1 | 53.8 | 45.9 | 0 | 0.3 | 2.1 | 0.36 | 11.0 | 75 | 120 |
| C2 | 42.9 | 56.8 | 0 | 0.3 | 1.8 | 0.67 | 5.7 | 60 | 240 |

| Resin particle dispersion | Formulation Retention time (min) | G' (small) (Pa) | G' (large) (Pa) | tanδ 30-180 (small) | tanδ 30-180 (large) | tanδ 65-150 (small) | tanδ 65-150 (large) | Number-average particle size (nm) | SP value (S) |
|---|---|---|---|---|---|---|---|---|---|
| 1 | 500 | $2.6 \times 10^5$ | $8.0 \times 10^6$ | 0.028 | 2.35 | 0.028 | 0.203 | 153 | 9.07 |
| 2 | 600 | $3.0 \times 10^5$ | $4.1 \times 10^7$ | 0.024 | 2.31 | 0.024 | 0.215 | 181 | 9.09 |
| 3 | 400 | $1.2 \times 10^5$ | $8.3 \times 10^6$ | 0.035 | 2.33 | 0.035 | 0.476 | 219 | 9.07 |
| 4 | 350 | $2.7 \times 10^5$ | $8.0 \times 10^6$ | 0.043 | 2.45 | 0.043 | 0.401 | 112 | 9.07 |
| 5 | 500 | $3.1 \times 10^5$ | $8.6 \times 10^6$ | 0.014 | 2.37 | 0.014 | 0.189 | 135 | 9.07 |
| 6 | 500 | $2.8 \times 10^5$ | $7.9 \times 10^6$ | 0.031 | 2.29 | 0.031 | 0.245 | 291 | 9.07 |
| 7 | 500 | $2.7 \times 10^5$ | $8.1 \times 10^6$ | 0.033 | 2.31 | 0.033 | 0.239 | 64 | 9.07 |
| 8 | 500 | $3.0 \times 10^5$ | $8.1 \times 10^6$ | 0.029 | 2.32 | 0.029 | 0.226 | 305 | 9.07 |
| 9 | 500 | $3.0 \times 10^5$ | $8.0 \times 10^6$ | 0.034 | 2.36 | 0.034 | 0.228 | 57 | 9.07 |
| 10 | 500 | $2.7 \times 10^5$ | $8.1 \times 10^6$ | 0.031 | 2.39 | 0.031 | 0.214 | 162 | 9.13 |
| C1 | 300 | $2.9 \times 10^5$ | $6.1 \times 10^7$ | 0.026 | 2.45 | 0.026 | 0.221 | 165 | 9.10 |
| C2 | 700 | $8.1 \times 10^4$ | $4.3 \times 10^7$ | 0.090 | 2.32 | 0.033 | 0.631 | 190 | 9.09 |

Preparation of Amorphous Resin Particle Dispersion 1

Terephthalic acid 28 parts

Fumaric acid: 174 parts

Ethylene oxide (2 mol) adduct of bisphenol A: 26 parts

Propylene oxide (2 mol) adduct of bisphenol A: 542 parts

The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydrocondensation reaction is continued for 3 hours in the reaction solution kept at 240° C., and then the reactant is cooled.

The molten reactant is transferred as it is to CAVITRON CD1010 (manufactured by Eurotech Ltd.) at a rate of 100 g/min. At the same time, separately prepared aqueous ammonia having a concentration of 0.37% by mass is transferred to CAVITRON CD1010 at a rate of 0.1 L/min in a state of being heated at 120° C. with a heat exchanger. CAVITRON CD1010 is operated under the conditions of a rotation speed of a rotor of 60 Hz and a pressure of 5 kg/cm$^2$, thereby obtaining a resin particle dispersion in which particles of an amorphous polyester resin having a volume-average particle size of 175 nm are dispersed. Deionized water is added to the resin particle dispersion, and the solid content thereof is adjusted to 20% by mass, thereby obtaining an amorphous resin particle dispersion 1. The SP value (R) of the obtained amorphous polyester resin is 9.43.

Preparation of Amorphous Resin Particle Dispersion 2

Styrene: 72 parts n-Butyl acrylate: 27 parts

β-Carboxyethyl acrylate: 1.3 parts

Dodecanethiol: 2 parts

In a flask, a mixture obtained by mixing and dissolving the above materials is dispersed and emulsified in a surfactant solution prepared by dissolving 1.2 parts by mass of an anionic surfactant (TaycaPower, manufactured by TAYCA Co., Ltd.) in 100 parts by mass of deionized water. Then, the content in the flask is stirred, and in this state, an aqueous solution obtained by dissolving 6 parts by mass of ammonium persulfate in 50 parts by mass of deionized water is added thereto for 20 minutes. Thereafter, nitrogen purging is performed. Then, in a state where the content in the flask is being stirred, the flask is heated in an oil bath until the temperature of the content reaches 75° C., and the temperature is kept at 75° C. for 4 hours so that emulsion polymerization continues. In this way, a resin particle dispersion is obtained in which particles of an amorphous styrene acrylic resin having a volume-average particle size of 160 nm and a weight-average molecular weight of 56,000 are dispersed. Deionized water is added to the resin particle dispersion so that the solid content thereof is adjusted to 31.4% by mass, thereby obtaining an amorphous resin particle dispersion 2.

The SP value (R) of the obtained amorphous styrene acrylic resin is 9.14.

Preparation of Crystalline Resin Particle Dispersion 1,10-Dodecanedioic acid: 225 parts 1,6-Hexanediol: 143 parts The above materials are put in a reactor equipped with a stirrer, a nitrogen introduction tube, a temperature sensor, and a rectifying column, the temperature is raised to 160° C. for 1 hour, and 0.8 parts by mass of dibutyltin oxide is added thereto. While the generated water is being distilled off, the temperature is raised to 180° C. for 6 hours, a dehydrocondensation reaction is continued for 5 hours at a temperature kept at 180° C. Then, the temperature is slowly raised to 230° C. under reduced pressure, and the reaction solution is stirred for 2 hours in a state of being kept at 230° C. Thereafter, the reactant is cooled. After cooling, solid-liquid separation is performed, and the solids are dried, thereby obtaining a crystalline polyester resin.

Crystalline polyester resin: 100 parts

Methyl ethyl ketone: 40 parts

Isopropyl alcohol: 30 parts

10% aqueous ammonia solution: 6 parts

The above materials are put in a 3 L jacketed reaction vessel (manufactured by EYELA: BJ-30N) equipped with a condenser, a thermometer, a water dripping device, and an anchor blade. In a state where the reaction vessel is being kept at 80° C. in a water circulation-type thermostatic bath, and the materials are being stirred and mixed together at 100 rpm, the resin is dissolved. Then, the water circulation-type thermostatic bath is set to 50° C., and a total of 400 parts of deionized water kept at 50° C. is added dropwise thereto at a rate of 7 parts by mass/min so that phase transition occurs, thereby obtaining an emulsion. The obtained emulsion (576 parts by mass) and 500 parts by mass of deionized water are put in a 2 L eggplant flask and set in an evaporator (manufactured by EYELA) equipped with a vacuum controlled unit via a trap ball. While being rotated, the eggplant flask is heated in a hot water bath at 60° C., and the pressure is reduced to 7 kPa with care to sudden boiling, thereby removing the solvent. The volume-average particle size D50v of the resin particles in this dispersion is 185 nm. Then, deionized water is added thereto, thereby obtaining a crystalline resin particle dispersion having a solid content concentration of 22.1% by mass.

Preparation of Colorant Dispersion

Cyan pigment (PigmentBlue 15: 3 (copper phthalocyanine), manufactured by Dainichiseika Color & Chemicals Mfg. Co., Ltd.): 98 parts Anionic surfactant (TaycaPower manufactured by TAYCA Co., Ltd.): 2 parts Deionized water: 420 parts The above components are mixed together, dissolved, and dispersed with a homogenizer (IKA ULTRA-TURRAX) for 10 minutes, thereby obtaining a colorant dispersion having a mean particle size of 164 nm and a solid content of 21.1% by mass.

Preparation of Release Agent Dispersion

Synthetic wax (manufactured by NIPPON SEIRO CO., LTD., FNP92, melting temperature Tw: 92° C.): 50 parts Anionic surfactant (TaycaPower manufactured by TAYCA Co., Ltd.): 1 part Deionized water: 200 parts The above materials are mixed together, heated to 130° C., and dispersed using a homogenizer (ULTRA-TURRAX T50 manufactured by IKA). Then, by using Munton Gorlin high-pressure homogenizer (manufactured by Gorlin), dispersion treatment is performed, thereby obtaining a release agent dispersion (solid content of 20% by mass) in which release agent particles are dispersed. The volume-average particle size of the release agent particles is 214 nm.

Example 1

Amorphous resin particle dispersion 1: 169 parts

Specific resin particle dispersion 1: 33 parts

Crystalline resin particle dispersion: 53 parts

Release agent dispersion: 25 parts

Colorant dispersion: 33 parts

Anionic surfactant (Dowfax2A1 manufactured by The Dow Chemical Company): 4.8 parts The above raw materials with a liquid temperature adjusted to 10° C. are put in a 3 L cylindrical stainless steel container, and dispersed and mixed together for 2 minutes in a state where a shearing force is being added thereto at 4,000 rpm by a homogenizer (ULTRA-TURRAX T50 manufactured by IKA).

Then, as an aggregating agent, 1.75 parts of a 10% aqueous nitric acid solution of aluminum sulfate is slowly added dropwise thereto, and dispersed and mixed for 10 minutes by the homogenizer at a rotation speed of 10,000 rpm, thereby obtaining a raw material dispersion.

The raw material dispersion is then moved to a polymerization tank equipped with a stirrer using two paddles as stirring blades and a thermometer and start to be heated with a mantle heater at a rotation speed for stirring of 550 rpm, and the growth of aggregated particles is promoted at 40° C. At this time, by using 0.3 M nitric acid and a 1 M aqueous sodium hydroxide solution, the pH of the raw material dispersion is controlled in a range of 2.2 to 3.5. The raw material dispersion is kept in the above pH range for about 2 hours so that aggregated particles are formed.

Then, a dispersion prepared by mixing the amorphous resin particle dispersion 1: 21 parts with the specific resin particle dispersion 1: 8 parts is further added thereto, and the obtained dispersion is kept as it is for 60 minutes so that the binder resin particles and the specific resin particles adhere to the surface of the aggregated particles. The dispersion is heated to 53° C., the amorphous resin particle dispersion 1: 21 parts is then further added thereto, and the obtained dispersion is kept as it is for 60 minutes so that the binder resin particles adhere to the surface of the aggregated particles.

Aggregated particles are prepared in a state where the size and shape of particles are being checked using an optical microscope and MULTISIZER 3. Then, the pH is adjusted to 7.8 by using a 5% aqueous sodium hydroxide solution, and the dispersion is kept as it is for 15 minutes.

Thereafter, the pH is raised to 8.0 so that the aggregated particles are fused, and then the dispersion is heated up to 95° C. Six hours after the fusion of the aggregated particles is confirmed using an optical microscope, heating is stopped, and the dispersion is cooled at a cooling rate of 1.0° C./min. Subsequently, the particles are sieved with a 20 μm mesh, repeatedly washed with water, and then dried in a vacuum dryer, thereby obtaining toner particles 1.

The obtained toner particles (100 parts) and 0.7 parts of silica particles treated with dimethylsilicone oil (RY200 manufactured by Nippon Aerosil Co., Ltd.) are mixed together by a henschel mixer, thereby obtaining a toner 1.

Examples 2 to 11 and Comparative Examples C1 and C2

Toners 2 to 11 and toners C1 and C2 are obtained in the same manner as that adopted for obtaining the toner 1, except that the specific resin particle dispersion or comparative resin particle dispersion of the type shown in Table 2 is used instead of the specific resin particle dispersion 1, and the amount of the resin particles used is adjusted so that the content of the resin particles (that is, the specific resin particles or the comparative resin particles) with respect to the total amount of the toner particles reaches the value shown in 2.

Examples 12 to 14

Toners 12 to 14 are obtained in the same manner as that adopted for obtaining the toner 1, except that the amount of the crystalline resin particle dispersion added is adjusted so that the content of the crystalline resin with respect to the total amount of the binder resin reaches the value shown in the table.

Example 15

A toner 15 is obtained in the same manner as that adopted for obtaining the toner 1, except that instead of the amorphous resin particle dispersion 1, the amorphous resin particle dispersion of the type shown in the table is used in the amount shown in the table.

Example 16

Toner 16 is obtained in the same manner as that used for obtaining the toner 1, except that the rotation speed of the homogenizer is changed from 10,000 rpm to 5,000 rpm.

Example 17

A toner 17 is obtained in the same manner as that adopted for obtaining the toner 1, except that the amount of the crystalline resin particle dispersion added is adjusted so that the content of the crystalline resin with respect to the total amount of the binder resin reaches the value shown in the table.

Example 18

A toner 18 is obtained in the same manner as that adopted for obtaining the toner 1, except that the amount of the specific resin particle dispersion 1 used is adjusted so that the content of the specific resin particles with respect to the total amount of the toner particles reaches the value shown in the table, and the amount of the crystalline resin particle dispersion added is adjusted so that the content of the crystalline resin with respect to the total amount of the binder resin reaches the value show in the table.

Example 19

A Toner 19 is obtained in the same manner as that adopted for obtaining the toner 1, except that the pH at the time of fusion of the aggregated particles is changed from 8.0 to 9.0.

Example 20

A toner 20 is obtained in the same manner as that adopted for obtaining the toner 1, except that the pH at the time of fusion of the aggregated particles is changed from 8.0 to 5.5.

Example 21

Amorphous resin particle dispersion 1: 169 parts
Crystalline resin particle dispersion 1: 53 parts
Release agent dispersion: 25 parts
Colorant dispersion: 33 parts
Anionic surfactant (Dowfax2A1 manufactured by The Dow Chemical Company): 4.8 parts The above raw materials with a liquid temperature adjusted to 30° C. are put in a 3 L cylindrical stainless steel container, and dispersed and mixed together for 2 minutes in a state where a shearing force is being added thereto at 4,000 rpm by a homogenizer (ULTRA-TURRAX T50 manufactured by IKA).

Then, as an aggregating agent, 1.75 parts of a 10% aqueous nitric acid solution of polyaluminum chloride is slowly added dropwise thereto, and dispersed and mixed for 3 minutes (shorter time compared to examples) by the homogenizer at a rotation speed of 4,000 rpm, thereby obtaining a raw material dispersion.

The raw material dispersion is then moved to a polymerization tank equipped with a stirrer using two paddles as stirring blades and a thermometer and start to be heated with a mantle heater at a rotation speed for stirring of 550 rpm, and the growth of aggregated particles is promoted at 40° C. At this time, by using 0.3 M nitric acid and a 1 M aqueous sodium hydroxide solution, the pH of the raw material dispersion is controlled in a range of 2.2 to 3.5. The raw material dispersion is kept in the above pH range for about 2 hours so that aggregated particles are formed.

Then, a dispersion prepared by mixing the amorphous resin particle dispersion 1: 42 parts with the specific resin particle dispersion 1: 41 parts is halved in quantity and further added thereto in two divided portions, and the obtained dispersion is kept as it is for 60 minutes so that the binder resin particles and the specific resin particles adhere to the surface of the aggregated particles.

Aggregated particles are prepared in a state where the size and shape of particles are being checked using an optical microscope and MULTISIZER 3. Then, the pH is adjusted to 7.8 by using a 5% aqueous sodium hydroxide solution, and the dispersion is kept as it is for 15 minutes.

Thereafter, the pH is raised to 8.0 so that the aggregated particles are fused, and then the dispersion is heated up to 85° C. Two hours after the fusion of the aggregated particles is confirmed using an optical microscope, heating is stopped, and the dispersion is cooled at a cooling rate of 1.0° C./min. Subsequently, the particles are sieved with a 20 μm mesh, repeatedly washed with water, and then dried in a vacuum dryer, thereby obtaining toner particles C5.

The obtained toner particles (100 parts) and 0.7 parts of silica particles treated with dimethylsilicone oil (RY200 manufactured by Nippon Aerosil Co., Ltd.) are mixed together by a henschel mixer, thereby obtaining a toner 21.

Example 22

A toner 22 is obtained in the same manner as that adopted for obtaining the toner 1, except that the temperature at the time of fusion in Example 1 is changed from 95° C. to 85° C., the pH at the time of fusion in Example 1 is changed from 8.0 to 7.0, and the time required for fusion in Example 1 is changed from 6 hours to 2 hours.

Comparative Example C3

Amorphous resin particle dispersion 1: 169 parts
Specific resin particle dispersion 1: 33 parts
Crystalline resin particle dispersion: 53 parts
Release agent dispersion: 25 parts
Colorant dispersion: 33 parts
Anionic surfactant (Dowfax2A1 manufactured by The Dow Chemical Company): 4.8 parts The above raw materials with a liquid temperature adjusted to 30° C. are put in a 3 L cylindrical stainless steel container, and dispersed and mixed together for 2 minutes in a state where a shearing force is being added thereto at 4,000 rpm by a homogenizer (ULTRA-TURRAX T50 manufactured by IKA).

Then, as an aggregating agent, 1.75 parts of a 10% aqueous nitric acid solution of aluminum sulfate is slowly added dropwise thereto, and dispersed and mixed for 3 minutes (shorter time compared to examples) by the homogenizer at a rotation speed of 4,000 rpm, thereby obtaining a raw material dispersion.

The raw material dispersion is then moved to a polymerization tank equipped with a stirrer using two paddles as stirring blades and a thermometer and start to be heated with a mantle heater at a rotation speed for stirring of 550 rpm, and the growth of aggregated particles is promoted at 40° C. At this time, by using 0.3 M nitric acid and a 1 M aqueous sodium hydroxide solution, the pH of the raw material dispersion is controlled in a range of 2.2 to 3.5. The raw material dispersion is kept in the above pH range for about 2 hours so that aggregated particles are formed.

Then, a dispersion prepared by mixing the amorphous resin particle dispersion 1: 21 parts with the specific resin particle dispersion 1: 8 parts is further added thereto, and the obtained dispersion is kept as it is for 60 minutes so that the binder resin particles and the specific resin particles adhere to the surface of the aggregated particles. The dispersion is heated to 53° C., the amorphous resin particle dispersion: 21 parts is then further added thereto, and the obtained dispersion is kept as it is for 60 minutes so that the binder resin particles adhere to the surface of the aggregated particles.

Aggregated particles are prepared in a state where the size and shape of particles are being checked using an optical microscope and MULTISIZER 3. Then, the pH is adjusted to 7.8 by using a 5% aqueous sodium hydroxide solution, and the dispersion is kept as it is for 15 minutes.

Thereafter, the pH is raised to 8.0 so that the aggregated particles are fused, and then the dispersion is heated up to 85° C. Two hours after the fusion of the aggregated particles is confirmed using an optical microscope, heating is stopped, and the dispersion is cooled at a cooling rate of 1.0° C./min. Subsequently, the particles are sieved with a 20 μm mesh, repeatedly washed with water, and then dried in a vacuum dryer, thereby obtaining toner particles C3.

The obtained toner particles (100 parts) and 0.7 parts of silica particles treated with dimethylsilicone oil (RY200 manufactured by Nippon Aerosil Co., Ltd.) are mixed together by a henschel mixer, thereby obtaining a toner C3.

Comparative Example C4

Amorphous resin particle dispersion 1: 169 parts
Specific resin particle dispersion 1: 41 parts
Crystalline resin particle dispersion: 53 parts
Release agent dispersion: 25 parts
Colorant dispersion: 33 parts
Anionic surfactant (Dowfax2A1 manufactured by The Dow Chemical Company): 4.8 parts The above raw materials with a liquid temperature adjusted to 30° C. are put in a 3 L cylindrical stainless steel container, and dispersed and mixed together for 2 minutes in a state where a shearing force is being added thereto at 4,000 rpm by a homogenizer (ULTRA-TURRAX T50 manufactured by IKA).

Then, as an aggregating agent, 1.75 parts of a 10% aqueous nitric acid solution of aluminum sulfate is slowly added dropwise thereto, and dispersed and mixed for 3 minutes (shorter time compared to examples) by the homogenizer at a rotation speed of 4,000 rpm, thereby obtaining a raw material dispersion.

The raw material dispersion is then moved to a polymerization tank equipped with a stirrer using two paddles as stirring blades and a thermometer and start to be heated with a mantle heater at a rotation speed for stirring of 550 rpm, and the growth of aggregated particles is promoted at 40° C. At this time, by using 0.3 M nitric acid and a 1 M aqueous sodium hydroxide solution, the pH of the raw material dispersion is controlled in a range of 2.2 to 3.5. The raw material dispersion is kept in the above pH range for about 2 hours so that aggregated particles are formed.

Then, the amorphous resin particle dispersion 1: 42 parts is further added thereto, and the obtained dispersion is kept as it is for 60 minutes so that the binder resin particles adhere to the surface of the aggregated particles.

Aggregated particles are prepared in a state where the size and shape of particles are being checked using an optical microscope and MULTISIZER 3. Then, the pH is adjusted to 7.8 by using a 5% aqueous sodium hydroxide solution, and the dispersion is kept as it is for 15 minutes.

Thereafter, the pH is raised to 8.0 so that the aggregated particles are fused, and then the dispersion is heated up to 85° C. Two hours after the fusion of the aggregated particles is confirmed using an optical microscope, heating is stopped, and the dispersion is cooled at a cooling rate of 1.0° C./min. Subsequently, the particles are sieved with a 20 μm mesh, repeatedly washed with water, and then dried in a vacuum dryer, thereby obtaining toner particles C4.

The obtained toner particles (100 parts) and 0.7 parts of silica particles treated with dimethylsilicone oil (RY200 manufactured by Nippon Aerosil Co., Ltd.) are mixed together by a henschel mixer, thereby obtaining a toner C4.

Regarding the obtained toners, Table 2 shows the type of specific resin particle dispersion or comparative resin particle dispersion ("Particles•type" in the table), the content of the specific resin particles or comparative resin particles with respect to the total amount of toner particles ("Particles•content (%)" in the table), the content of the crystalline resin with respect to the total amount of the toner particles ("Crystalline•content (%)" in the table), and the type of the amorphous resin particle dispersion ("Amorphous•type" in the table).

Table 2 shows the storage modulus G' of the extra components in a range of 30° C. or higher and 50° C. or lower ("G' (Pa)" in the table), the specific elastic modulus achieving temperature of the extra components ("Achieving temperature (° C.)" in the table), and the loss tangent tan δ at the specific elastic modulus achieving temperature ("tan δ" in the table) that are determined by the methods described above.

Regarding the obtained toners, Tables 3 and 4 show each of the loss moduli G"5 (150), G"50 (180), G"1 (150), G"50 (150), and G"1 (180), the ratio G"50 (150)/G"50 (180) ("Ratio 50 (150-180) in the tables), and the ratio G"1 (180)/G"50 (180) ("Ratio 1-50 (180)" in the tables).

Regarding the obtained toners, Tables 3 and 4 show the minimum loss modulus G"5 (t1) and the maximum loss modulus G"5 (t1) at 150° C. and a strain of 5% (G"5 (t1) min and G"5 (t1) max in the tables), the minimum loss modulus G"50 (t2) and the maximum loss modulus G"50 (t2) at 180° C. and a strain of 50% (G"50 (t2) min and G"50 (t2) max in the tables), the ratio between the above minimum loss moduli (G"5 (t1)/G"50 (t2) min), and the ratio between the above maximum loss moduli (G"5 (t1)/G"50 (t2) max). The temperature difference (t2−t1) between the first temperature t1 and the second temperature t2 is 30° C.

In Tables 3 and 4, the portion after E in each loss modulus represents an exponential function. For example, in Table 3, "4.2E+0.3" as a value of G"5 (t1) of Example 1 means 4,200.

Regarding the obtained toners, Tables 3 and 4 show the storage modulus G' in a range of 30° C. or higher and 50° C. or lower ("G' (30-50)" in the tables), the specific elastic modulus achieving temperature ("Achieving temperature (° C.)" in the tables), and the value of log G'p−log G'r ("Difference in viscoelasticity" in the tables) that are determined by the methods described above.

Preparation of Developer

Each of the obtained toners (8 parts) and 100 parts of the following carrier are mixed together, thereby obtaining a developer.

Preparation of Carrier

- Ferrite particles (average particle size 50 μm) 100 parts
- Toluene 14 parts
- Styrene-methyl methacrylate copolymer (copolymerization ratio 15/85) 3 parts
- Carbon black 0.2 parts The above components excluding the ferrite particles are dispersed with a sand mill, thereby preparing a dispersion. The dispersion is put in a vacuum deaeration-type kneader together with the ferrite particles, and dried under reduced pressure while being stirred, thereby obtaining a carrier.

Evaluation

Image Density Unevenness

A developing unit of a color copy machine ApeosPortIV C3370 (manufactured by FUJIFILM Business Innovation Corp.) from which a fixing unit has been detached is filled with the obtained developer, and an unfixed image is printed out which includes a region having a size of 50 mm×50 mm where a toner application amount is 0.30 mg/cm$^2$ (low application region) and a region having a size of 50 mm×50 mm where a toner application amount is 0.90 mg/cm$^2$ (high application region). The image density of the image printed out is 100%. As a recording medium, LEATHAC 66 paper having a 12 inch×18 inch size (basis weight 151 gsm) manufactured by FUJIFILM Business Innovation Corp. is used.

A device used for evaluating fixing is prepared by detaching a fixing unit from ApeosPortIV C3370 manufactured by FUJIFILM Business Innovation Corp., and modifying the machine so that nip pressure and fixing temperature can be changed. The process speed is 175 mm/sec.

Under these conditions, the unfixed image is fixed under a high-temperature and high-pressure condition (specifically, a fixing unit temperature of 180° C. and a nip pressure of 6.0 kgf/cm$^2$), thereby obtaining a fixed image. The image density of the low application region and the high application region in the obtained fixed image is measured using an image densitometer X-Rite 938 (manufactured by X-Rite, Incorporated.), the difference in image density between the region where a toner application amount is low and a region where a toner application amount is high is calculated, and image density unevenness is evaluated according to the following criteria. The results are shown Tables 3 and 4.

A: The difference in image density is 0.2 or less, and is not visually recognized.

B: The difference in image density is more than 0.2 and 0.25 or less, and it is difficult to visually recognize the difference.

B: The difference in image density is more than 0.25 and 0.3 or less, which is in the acceptable range.

D: The difference in image density is more than 0.3, which is out of the acceptable range.

Fixability

The high application region in the fixed image used for evaluating the image density unevenness is folded using a weight, and the image quality is evaluated based on the degree of image defect in the folded portion. The evaluation criteria are as follows, and the results are shown in Tables 3 and 4.

G1: An image defect is not observed at all.

G2: Although an image defect is observed, the defect is mild.

G3: Although a mild image defect is observed, the defect is in the acceptable range.

G4: An image defect is observed, which is out of the acceptable range.

G5: A marked image defect is observed, which is out of the acceptable range.

TABLE 2

| Example Comparative Example | Toner | Particles Type | Particles Content rate (%) | Crystalline Content rate (%) | Amorphous Type | Extra components G' (Pa) | Extra components Achieving temperature (° C.) | Extra components tanδ |
|---|---|---|---|---|---|---|---|---|
| 1 | 1 | 1 | 10 | 15 | 1 | $3.0 \times 10^8$-$5.3 \times 10^8$ | 72 | 1.40 |
| 2 | 2 | 2 | 10 | 15 | 1 | $3.0 \times 10^8$-$5.3 \times 10^8$ | 72 | 1.40 |
| 3 | 3 | 3 | 10 | 15 | 1 | $3.0 \times 10^8$-$5.3 \times 10^8$ | 72 | 1.40 |
| 4 | 4 | 4 | 10 | 15 | 1 | $3.0 \times 10^8$-$5.3 \times 10^8$ | 72 | 1.40 |
| 5 | 5 | 5 | 10 | 15 | 1 | $3.0 \times 10^8$-$5.3 \times 10^8$ | 72 | 1.40 |
| 6 | 6 | 6 | 10 | 15 | 1 | $3.0 \times 10^8$-$5.3 \times 10^8$ | 72 | 1.40 |
| 7 | 7 | 7 | 10 | 15 | 1 | $3.0 \times 10^8$-$5.3 \times 10^8$ | 72 | 1.40 |
| 8 | 8 | 8 | 10 | 15 | 1 | $3.0 \times 10^8$-$5.3 \times 10^8$ | 72 | 1.40 |
| 9 | 9 | 9 | 10 | 15 | 1 | $3.0 \times 10^8$-$5.3 \times 10^8$ | 72 | 1.40 |
| 10 | 10 | 1 | 29 | 15 | 1 | $3.0 \times 10^8$-$5.3 \times 10^8$ | 72 | 1.40 |
| 11 | 11 | 1 | 2 | 15 | 1 | $3.0 \times 10^8$-$5.3 \times 10^8$ | 72 | 1.40 |
| 12 | 12 | 1 | 4 | 49 | 1 | $9.1 \times 10^7$-$2.3 \times 10^8$ | 69 | 1.52 |
| 13 | 13 | 1 | 10 | 4 | 1 | $3.8 \times 10^8$-$6.0 \times 10^8$ | 77 | 1.21 |
| 14 | 14 | 1 | 10 | 0 | 1 | $5.5 \times 10^8$-$7.0 \times 10^8$ | 81 | 1.55 |
| 15 | 15 | 1 | 10 | 15 | 2 | $4.3 \times 10^8$-$6.1 \times 10^8$ | 81 | 1.51 |
| 16 | 16 | 1 | 10 | 15 | 1 | $3.0 \times 10^8$-$5.3 \times 10^8$ | 72 | 1.40 |
| 17 | 17 | 1 | 10 | 2 | 1 | $3.7 \times 10^8$-$5.9 \times 10^8$ | 90 | 1.24 |
| 18 | 18 | 1 | 15 | 23 | 1 | $1.2 \times 10^8$-$4.5 \times 10^8$ | 68 | 1.43 |
| 19 | 19 | 1 | 10 | 15 | 1 | $3.0 \times 10^8$-$5.3 \times 10^8$ | 71 | 1.57 |
| 20 | 20 | 1 | 10 | 15 | 1 | $3.0 \times 10^8$-$5.3 \times 10^8$ | 76 | 0.85 |
| 21 | 25 | 1 | 10 | 15 | 1 | $3.0 \times 10^8$-$5.3 \times 10^8$ | 72 | 1.4 |
| 22 | 1 | 1 | 10 | 15 | 1 | $3.0 \times 10^8$-$5.3 \times 10^8$ | 72 | 1.40 |
| C1 | C1 | C1 | 10 | 15 | 1 | $3.0 \times 10^8$-$5.3 \times 10^8$ | 72 | 1.4 |
| C2 | C2 | C2 | 10 | 15 | 1 | $3.0 \times 10^8$-$5.3 \times 10^8$ | 72 | 1.4 |
| C3 | C3 | 1 | 10 | 15 | 1 | $3.0 \times 10^8$-$5.3 \times 10^8$ | 72 | 1.4 |
| C4 | C4 | 1 | 10 | 15 | 1 | $3.0 \times 10^8$-$5.3 \times 10^8$ | 72 | 1.4 |

TABLE 3

| Example Comparative Example | | G"5 (t1) min (Pa) | G"5 (t1) max (Pa) | G"5 (t1) min (Pa) | G"5 (t1) max (Pa) | Minimum value of G"5 (t1)/ G"50 (t2) | Maximum value of G"5 (t1)/ G"50 (t2) | G"5 (150) (Pa) | G"50 (180) (Pa) | G"1 (150) (Pa) | G"50 (150) (Pa) | G"1 (180) (Pa) |
|---|---|---|---|---|---|---|---|---|---|---|---|---|
| 1 | 1 | 4.2E+03 | 5.4E+03 | 2.0E+03 | 2.6E+03 | 1.62 | 2.70 | 5.4E+03 | 2.0E+03 | 5.5E+03 | 3.2E+03 | 2.6E+03 |
| 2 | 2 | 3.4E+03 | 5.7E+03 | 2.IE+03 | 3.3E+03 | 1.03 | 2.71 | 5.7E+03 | 2.IE+03 | 5.8E+03 | 3.3E+03 | 2.8E+03 |
| 3 | 3 | 4.0E+03 | 5.3E+03 | 1.8E+03 | 2.5E+03 | 1.60 | 2.94 | 5.3E+03 | 1.8E+03 | 5.4E+03 | 3.0E+03 | 2.5E+03 |
| 4 | 4 | 4.2E+03 | 5.4E+03 | 1.9E+03 | 2.5E+03 | 1.68 | 2.84 | 5.4E+03 | 1.9E+03 | 5.6E+03 | 3.2E+03 | 2.7E+03 |
| 5 | 5 | 4.3E+03 | 5.4E+03 | 2.IE+03 | 2.7E+03 | 1.59 | 2.57 | 5.4E+03 | 2.IE+03 | 5.5E+03 | 3.3E+03 | 2.5E+03 |
| 6 | 6 | 4.2E+03 | 5.4E+03 | 2.0E+03 | 2.5E+03 | 1.68 | 2.70 | 5.4E+03 | 2.0E+03 | 5.5E+03 | 3.IE+03 | 2.4E+03 |
| 7 | 7 | 4.IE+03 | 5.3E+03 | 2.2E+03 | 2.8E+03 | 1.46 | 2.41 | 5.3E+03 | 2.2E+03 | 5.3E+03 | 3.2E+03 | 2.6E+03 |
| 8 | 8 | 4.2E+03 | 5.3E+03 | 1.8E+03 | 2.4E+03 | 1.75 | 2.94 | 5.3E+03 | 1.8E+03 | 5.4E+03 | 2.8E+03 | 2.2E+03 |
| 9 | 9 | 4.2E+03 | 5.4E+03 | 2.2E+03 | 2.8E+03 | 1.50 | 2.45 | 5.4E+03 | 2.2E+03 | 5.5E+03 | 3.2E+03 | 2.5E+03 |
| 10 | 10 | 3.9E+03 | 5.0E+03 | 1.7E+03 | 2.5E+03 | 1.56 | 2.94 | 5.0E+03 | 1.7E+03 | 5.2E+03 | 3.2E+03 | 2.2E+03 |
| 11 | 11 | 4.6E+03 | 5.7E+03 | 2.0E+03 | 2.6E+03 | 1.77 | 2.85 | 5.7E+03 | 2.0E+03 | 5.9E+03 | 3.5E+03 | 2.7E+03 |
| 12 | 12 | 3.8E+03 | 4.4E+03 | 1.5E+03 | 2.3E+03 | 1.65 | 2.93 | 4.4E+03 | 1.5E+03 | 4.6E+03 | 3.0E+03 | 2.IE+03 |
| 13 | 13 | 4.4E+03 | 5.6E+03 | 2.3E+03 | 3.0E+03 | 1.47 | 2.43 | 5.6E+03 | 2.3E+03 | 5.7E+03 | 3.2E+03 | 2.9E+03 |
| 14 | 14 | 6.0E+03 | 8.0E+03 | 5.1E+03 | 4.2E+03 | 1.43 | 1.57 | 8.0E+03 | 5.IE+03 | 8.0E+03 | 7.0E+03 | 5.2E+03 |
| 15 | 15 | 5.4E+03 | 7.6E+03 | 4.8E+03 | 3.9E+03 | 1.38 | 1.58 | 7.6E+03 | 4.8E+03 | 7.6E+03 | 6.2E+03 | 5.0E+03 |

| Example Comparative Example | Ratio 50 (150-180) | Ratio 1-50 (150-180) | G' (30-50) (Pa) | Achieving temperature (° C.) | Difference in viscoelasticity | Difference in SP value | Image density unevenness | Fixability |
|---|---|---|---|---|---|---|---|---|
| 1 | 1.60 | 2.75 | $2.5 \times 10^8$-$4.8 \times 10^8$ | 82 | 3.3 | −0.28 | A | G1 |
| 2 | 1.57 | 2.76 | $2.6 \times 10^8$-$5.0 \times 10^8$ | 86 | 3.0 | −0.28 | B | G3 |
| 3 | 1.67 | 3.00 | $2.5 \times 10^8$-$4.8 \times 10^8$ | 83 | 3.0 | −0.30 | B | G2 |
| 4 | 1.68 | 2.95 | $2.5 \times 10^8$-$4.8 \times 10^8$ | 82 | 3.3 | −0.30 | B | G2 |
| 5 | 1.57 | 2.62 | $2.5 \times 10^8$-$4.8 \times 10^8$ | 82 | 3.7 | −0.30 | B | G3 |
| 6 | 1.55 | 2.75 | $2.5 \times 10^8$-$4.8 \times 10^8$ | 82 | 3.4 | −0.30 | B | G2 |
| 7 | 1.45 | 2.41 | $2.5 \times 10^8$-$4.8 \times 10^8$ | 83 | 3.2 | −0.30 | B | G3 |

TABLE 3-continued

| | | | | | | | | |
|---|---|---|---|---|---|---|---|---|
| 8 | 1.56 | 3.00 | $2.5 \times 10^8$-$4.8 \times 10^8$ | 83 | 3.5 | −0.30 | B | G2 |
| 9 | 1.45 | 2.50 | $2.5 \times 10^8$-$4.8 \times 10^8$ | 82 | 3.3 | −0.30 | B | G3 |
| 10 | 1.88 | 3.06 | $1.5 \times 10^8$-$4.3 \times 10^8$ | 88 | 2.5 | −0.28 | C | G2 |
| 11 | 1.75 | 2.95 | $2.9 \times 10^8$-$5.2 \times 10^8$ | 80 | 3.8 | −0.28 | B | G1 |
| 12 | 2.00 | 3.07 | $1.3 \times 10^8$-$4.2 \times 10^8$ | 74 | 3.7 | −0.14 | C | G1 |
| 13 | 1.39 | 2.48 | $3.2 \times 10^8$-$6.1 \times 10^8$ | 88 | 3.1 | −0.32 | B | G3 |
| 14 | 1.37 | 1.57 | $4.5 \times 10^8$-$6.8 \times 10^8$ | 89 | 1.5 | −0.30 | B | G3 |
| 15 | 1.29 | 1.58 | $3.1 \times 10^8$-$4.8 \times 10^8$ | 87 | 2.2 | −0.18 | C | G3 |

TABLE 4

| Example Comparative Example | | G"5 (t1) min (Pa) | G"5 (t1) max (Pa) | G"50 (t2) min (Pa) | G"50 (t2) max (Pa) | Minimum value of G"5 (t1)/ G"50 (t2) | Maximum value of G"5 (t1)/ G"50 (t2) | G"5 (150) (Pa) | G"50 (180) (Pa) | G"1 (150) (Pa) | G"50 (150) (Pa) | G"1 (180) (Pa) |
|---|---|---|---|---|---|---|---|---|---|---|---|---|
| 16 | 16 | 4.5E+03 | 5.0E+03 | 2.2E+03 | 2.4E+03 | 1.88 | 2.27 | 5.0E+03 | 2.2E+03 | 5.IE+03 | 3.4E+03 | 2.4E+03 |
| 17 | 17 | 5.2E+03 | 6.2E+03 | 2.6E+03 | 3.4E+03 | 1.53 | 2.38 | 6.2E+03 | 2.6E+03 | 6.3E+03 | 3.8E+03 | 2.7E+03 |
| 18 | 18 | 4.0E+03 | 5.0E+03 | 1.7E+03 | 2.4E+03 | 1.67 | 2.94 | 5.0E+03 | 1.7E+03 | 5.IE+03 | 3.5E+03 | 1.8E+03 |
| 19 | 19 | 4.3E+03 | 5.4E+03 | 1.9E+03 | 2.5E+03 | 1.72 | 2.84 | 5.4E+03 | 1.9E+03 | 5.4E+03 | 3.IE+03 | 2.0E+03 |
| 20 | 20 | 4.2E+03 | 5.5E+03 | 2.IE+03 | 2.4E+03 | 1.75 | 2.62 | 5.5E+03 | 2.IE+03 | 5.6E+03 | 3.IE+03 | 2.4E+03 |
| 21 | 21 | 4.6E+03 | 5.7E+03 | 2.0E+03 | 2.4E+03 | 1.92 | 2.85 | 5.7E+03 | 2.0E+03 | 5.9E+03 | 3.4E+03 | 2.5E+03 |
| 22 | 22 | 3.8E+03 | 5.0E+03 | 1.8E+03 | 2.2E+03 | 1.73 | 2.78 | 5.0E+03 | 1.8E+03 | 5.2E+03 | 3.2E+03 | 2.2E+03 |
| C1 | C1 | 4.4E+03 | 5.6E+03 | 1.7E+03 | 1.5E+03 | 2.93 | 3.29 | 5.6E+03 | 1.7E+03 | 5.7E+03 | 3.5E+03 | 2.2E+03 |
| C2 | C2 | 2.9E+03 | 3.8E+03 | 9.0E+02 | 8.0E+02 | 3.63 | 4.22 | 3.8E+03 | 9.0E+02 | 4.0E+03 | 3.3E+03 | 1.1E+03 |
| C3 | C3 | 4.2E+03 | 5.3E+03 | 1.6E+03 | 1.5E+03 | 2.80 | 3.31 | 5.3E+03 | 1.6E+03 | 5.4E+03 | 3.IE+03 | 1.9E+03 |
| C4 | C4 | 4.0E+03 | 5.2E+03 | 1.7E+03 | 1.6E+03 | 2.50 | 3.06 | 5.2E+03 | 1.7E+03 | 5.4E+03 | 2.9E+03 | 2.0E+03 |

| Example Comparative Example | Ratio 50 (150-180) | Ratio 1-50 (150-180) | G' (30-50) (Pa) | Achieving temperature (° C.) | Difference in viscoelasticity | Difference in SP value | Image density unevenness | Fixability |
|---|---|---|---|---|---|---|---|---|
| 16 | 1.55 | 2.32 | $2.3 \times 10^8$-$4.7 \times 10^8$ | 80 | 3.1 | −0.28 | C | G2 |
| 17 | 1.46 | 2.42 | $2.7 \times 10^8$-$5.0 \times 10^8$ | 90 | 2.6 | −0.32 | B | G3 |
| 18 | 2.06 | 3.00 | $8.5 \times 10^7$-$3.2 \times 10^8$ | 79 | 2.9 | −0.25 | C | G2 |
| 19 | 1.63 | 2.84 | $2.1 \times 10^8$-$4.6 \times 10^8$ | 80 | 2.6 | −0.28 | C | G2 |
| 20 | 1.48 | 2.67 | $2.4 \times 10^8$-$4.9 \times 10^8$ | 87 | 3.8 | −0.28 | C | G2 |
| 21 | 1.70 | 2.95 | $2.7 \times 10^8$-$5.0 \times 10^8$ | 85 | 3.1 | −0.28 | C | G3 |
| 22 | 1.78 | 2.89 | $2.5 \times 10^8$-$4.8 \times 10^8$ | 80 | 3.3 | −0.28 | C | G1 |
| C1 | 2.06 | 3.35 | $2.5 \times 10^8$-$7.6 \times 10^8$ | 90 | 2.9 | −0.27 | D | G3 |
| C2 | 3.67 | 4.44 | $1.2 \times 10^8$-$3.6 \times 10^8$ | 72 | 2.5 | −0.28 | D | G3 |
| C3 | 1.94 | 3.38 | $2.6 \times 10^8$-$4.7 \times 10^8$ | 82 | 3.4 | −0.28 | D | G4 |
| C4 | 1.71 | 3.18 | $2.9 \times 10^8$-$5.1 \times 10^8$ | 83 | 3.1 | −0.28 | D | G3 |

The above results tell that the toner of the present example obtains excellent fixability and makes it possible to obtain a fixed image with slight image density unevenness between a region where a toner application amount is low and a region where a toner application amount is high.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

toner particles that contain a binder resin and resin particles, wherein each of a loss modulus G"5 (150) of the electrostatic charge image developing toner determined by measuring dynamic viscoelasticity of the electrostatic charge image developing toner at a temperature of 150° C. and a strain of 5% and a loss modulus G"50 (180) of the electrostatic charge image developing toner determined by measuring dynamic viscoelasticity of the electrostatic charge image developing toner at a temperature of 180° C. and a strain of 50% is $1\times 10^3$ Pa or more and $1\times10^4$ Pa or less, a relationship between a loss modulus G"5 (t1) of the electrostatic charge image developing toner at a first temperature t1 in a temperature range of 150° C. or higher and 180° C. or lower and a strain of 5% and a loss modulus G"50 (t2) of the electrostatic charge image developing toner at a second temperature t2 higher than the first temperature t1 in the temperature range of 150° C. or higher and 180° C. or lower and a strain of 50% satisfies the following Formula (1) in a case of a temperature difference (t2-t1) between the first temperature t1 and the second temperature t2 is 15° C. or higher, $$1<G''5(t1)/G''50(t2)<3.0, \qquad \text{Formula (1)}$$

in a case where dynamic viscoelasticity of the resin particles is measured at a heating rate of 2° C./min, a storage modulus G' of the resin particles in a range of 30° C. or higher and 180° C. or lower is $1\times10^5$ Pa or more and $5\times10^7$ Pa or less, a content of the resin particles is 2% by mass or more and 30% by mass or less with respect to a total mass of the toner particles, the resin particles are crosslinked resin particles, the crosslinked resin particles are styrene-(meth)acrylic resin particles, and the binder resin contains a polyester resin.

2. The electrostatic charge image developing toner according to claim 1, wherein in a case where dynamic viscoelasticity of the resin particles is measured at a heating rate of 2° C./min, a loss tangent tan δ of the resin particles in a range of 30° C. or higher and 180° C. or lower is 0.01 or more and 2.5 or less.

3. The electrostatic charge image developing toner according to claim 1, wherein a number-average particle size of the resin particles is 60 nm or more and 300 nm or less.

4. The electrostatic charge image developing toner according to claim 1, wherein a difference between an SP value (S) as a solubility parameter of the resin particles and an SP value (R) as a solubility parameter of the binder resin (SP value (S)−SP value (R)) is −0.32 or more and −0.12 or less.

5. The electrostatic charge image developing toner according to claim 1, wherein in a case where dynamic viscoelasticity of components of the toner particles excluding the resin particles is measured at a heating rate of 2° C./min, a storage modulus G' of the components in a range of 30° C. or higher and 50° C. or lower is $1\times10^8$ Pa or more, and a temperature at which the storage modulus G' of the components reaches a value less than $1\times10^5$ Pa is 65° C. or higher and 90° C. or lower.

6. The electrostatic charge image developing toner according to claim 5, wherein in a case where dynamic viscoelasticity of the components of the toner particles excluding the resin particles is measured at a heating rate of 2° C./min, a loss tangent tan δ of the components at the temperature at which the storage modulus G' of the component reaches a value less than $1\times10^5$ Pa is 0.8 or more and 1.6 or less.

7. The electrostatic charge image developing toner according to claim 1, wherein in a case where log G'p represents a common logarithm of the storage modulus G' of the resin particles in a range of 90° C. or higher and 180° C. or lower that is determined by measuring dynamic viscoelasticity of the resin particles at a heating rate of 2° C./min, and log G'r represents a common logarithm of a storage modulus G' of components of the toner particles excluding the resin particles in a range of 90° C. or higher and 180° C. or lower that is determined by measuring dynamic viscoelasticity of the components at a heating rate of 2° C./min, a value of log G'p−log G'r is 1.0 or more and 4.0 or less.

8. The electrostatic charge image developing toner according to claim 1, wherein in a case where dynamic viscoelasticity of the electrostatic charge image developing toner is measured at a heating rate of 2° C./min, a storage modulus G' of the electrostatic charge image developing toner in a range of 30° C. or higher and 50° C. or lower is $1\times10^8$ Pa or more, and a temperature at which the storage modulus G' of the electrostatic charge image developing toner reaches a value less than $1\times10^5$ Pa is 70° C. or higher and 90° C. or lower.

9. The electrostatic charge image developing toner according to claim 1, wherein the binder resin contains a crystalline resin, and a content of the crystalline resin is 4% by mass or more and 50% by mass or less with respect to a total mass of the binder resin.

10. An electrostatic charge image developer comprising:

the electrostatic charge image developing toner according to claim 1.

11. A toner cartridge comprising:

a container that contains the electrostatic charge image developing toner according to claim 1, wherein the toner cartridge is detachable from an image forming apparatus.

12. A process cartridge comprising:

a container that contains the electrostatic charge image developer according to claim 10; and a developing unit that develops an electrostatic charge image formed on a surface of an image holder as a toner image by using the electrostatic charge image developer, wherein the process cartridge is detachable from an image forming apparatus.

13. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 10 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

14. An image forming method comprising:

charging a surface of an image holder;

forming an electrostatic charge image on the charged surface of the image holder;

developing the electrostatic charge image formed on the surface of the image holder as a color toner image by using the color electrostatic charge image developer according to claim 10;

transferring the toner image formed on the surface of the image holder to a surface of a recording medium; and fixing the toner image transferred to the surface of the recording medium.

* * * * *